(12) United States Patent
Murakami et al.

(10) Patent No.: US 7,012,857 B2
(45) Date of Patent: Mar. 14, 2006

(54) MAGNETO OPTICAL RECORDING MEDIUM HAVING A MULTILAYER RECORDING FILM OF DIFFERENT THICKNESS

(75) Inventors: Motoyoshi Murakami, Hirakata (JP); Yuko Kawaguchi, Ibaraki (JP); Yasumori Hino, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 169 days.

(21) Appl. No.: 10/297,012

(22) PCT Filed: May 28, 2001

(86) PCT No.: PCT/JP01/04473

§ 371 (c)(1),
(2), (4) Date: Nov. 27, 2002

(87) PCT Pub. No.: WO01/93259

PCT Pub. Date: Dec. 6, 2001

(65) Prior Publication Data

US 2003/0156502 A1 Aug. 21, 2003

(30) Foreign Application Priority Data

May 31, 2000 (JP) .................................. 2000-163775

(51) Int. Cl.
*G11B 11/00* (2006.01)

(52) U.S. Cl. ............................. 369/13.42; 369/13.54; 369/13.55; 369/13.07; 428/694 MM

(58) Field of Classification Search ............. 369/13.54, 369/13.55, 13.42, 13.07, 13.06, 13.05, 13.08, 369/13.09, 275.4; 428/63, 694 ML, 694 MM
See application file for complete search history.

(56) References Cited

U.S. PATENT DOCUMENTS

| 5,995,472 | A | | 11/1999 | Fujii et al. |
| 6,177,175 | B1 | * | 1/2001 | Hashimoto ............... 369/13.06 |
| 6,180,208 | B1 | * | 1/2001 | Shiratori et al. ......... 369/13.42 |
| 6,265,062 | B1 | * | 7/2001 | Shiratori ..................... 428/332 |
| 6,826,131 | B1 | * | 11/2004 | Kawaguchi et al. ..... 369/13.44 |

FOREIGN PATENT DOCUMENTS

| EP | 0 618 572 A2 | 10/1994 |
| EP | 0 831 465 A1 | 3/1998 |
| JP | 01-223650 A | 9/1989 |
| JP | 10-092017 A | 4/1998 |
| JP | 10-092031 | 4/1998 |
| JP | 10-275369 A | 10/1998 |
| JP | 11-120636 A | 4/1999 |
| JP | 11-195252 A | 7/1999 |
| JP | 11-195253 A | 7/1999 |
| JP | 11-306607 A | 11/1999 |
| JP | 11-312342 A | 11/1999 |

* cited by examiner

*Primary Examiner*—Tan Dinh
(74) *Attorney, Agent, or Firm*—Akin Gump Struss Hauer & Feld, LLP

(57) ABSTRACT

A magneto optical recording medium capable of stable recording and readout using a DWDD system is provided. The magneto optical recording medium of the present invention comprises an optical disk substrate and a multilayer recording film comprising essentially a readout layer, an intermediate layer, and a recording layer successively formed on top of the substrate. The readout layer has a smaller magnetic domain wall coercivity than the recording layer. The intermediate layer comprises a magnetic layer whose Curie temperature is lower than the readout layer and the recording layer. A recorded/readout magnetic domain corresponding to recorded/readout information is formed only in a groove area of the optical disk substrate. The thickness of the recording film at the boundary between mutually adjacent recording track areas is smaller than the thickness of the recording film in the center portions of the recording track areas.

7 Claims, 17 Drawing Sheets

(a) mark length = 0.2 μm (b) mark length = 0.15 μm (c) mark length = 0.1 μm (a)

(b)

(a)

(b)

MAGNETO OPTICAL RECORDING MEDIUM HAVING A MULTILAYER RECORDING FILM OF DIFFERENT THICKNESS

CROSS-REFERENCE TO RELATED APPLICATION

This application is a Section 371 of International Application No. PCT/JP01/04473, filed May 28, 2001, which was published in the English language on Dec. 6, 2001, under International Publication No. WO 01/93259 A1 and the disclosure of which is incorporated herein by reference.

TECHNICAL FIELD

The present invention relates to a magneto optical recording medium on which information is recorded and erased utilizing a temperature rise caused by the radiation of a laser beam, and from which recorded signals are read out using a magneto optical effect; the invention also relates to a manufacturing method for the medium and a method and apparatus for reading the medium.

BACKGROUND ART

Heretofore, various kinds of optical memories have been proposed which allow recorded information to be read out by irradiating a light beam on an information recording medium and detecting light reflected from it; examples of such optical memories include a ROM type memory which records information in the form of phase pits, a write once optical memory which records information by forming holes in a recording film by applying a light beam, a phase change optical memory which records information by causing a crystalline phase change in the recording film by applying a light beam, and a magneto optical memory which records information by applying a light beam and a magnetic field and thereby changing the direction of magnetization in the recording layer.

In these optical memories, signal readout resolution has been determined almost always by the wavelength λ of the reading light and the numerical aperture (N.A.) of the objective lens, and the minimum detectable pit spacing has been limited to about λ/(2·N.A.). Since it is not easy to reduce the wavelength of the reading light or increase the numerical aperture of the objective lens, attempts have been made to increase the information recording density by improving the recording media or readout methods. Among others, for magneto optical recording media, various strategies have been proposed to increase the information recording density. For example, Japanese Unexamined Patent Publication No. Hei 6-290496 discloses a technique that achieves a readout resolution exceeding the detection limit determined by the wavelength and the numerical aperture of the objective lens, by sequentially displacing the magnetic domain wall coming into the spot of the reading light beam and detecting the displacement of the magnetic domain wall. In this technique, if the readout layer, a first magnetic layer where the magnetic domain wall coming into the spot of the reading light beam is displaced, is formed in such a manner that adjacent information tracks are magnetically isolated from each other, a particularly good readout signal can be obtained.

However, to provide stable magnetic isolation between adjacent information tracks in the magnetic layer, the prior art has required that laser annealing be applied between the information tracks. Laser annealing, however, has had the problem that it is a time consuming process, and there has been a need for a method that can provide magnetic isolation between adjacent information tracks in a simpler way.

On the other hand, if a method is employed that achieves isolation between adjacent information tracks by using an optical disk-substrate having a land-groove configuration with a deep groove structure, the laser annealing step can be eliminated, but this method in turn has had the problems that the land-groove patterns with a deep groove structure are difficult to transfer when producing a substrate by injection molding, and that groove noise on the optical disk substrate increases because of the deep groove structure.

The present invention has been devised to resolve the above problems associated with the prior art, and it is an object of the invention to provide a magneto optical recording medium, and a method for reading the same, that can achieve high speed readout of signals whose recorded mark size is smaller than the diffraction limit of the information recording/reading light spot, and that can greatly improve the recording density and transfer speed, while eliminating the need for laser annealing and reducing the groove noise on the substrate.

The invention also provides a magneto optical recording medium having a structure such that the width of a groove area, which is a rewritable area, is 0.8 $\mu$m or less and height difference between the land and groove areas is within a range of 20 nm to 80 nm, and that the surface roughness of the land area is 1.5 nm or more; with this structure, the magneto optical recording medium achieves excellent signal characteristics that can suppress a ghost signal being copied from the rear of the light spot when a DWDD system is used for readout. The invention is also directed to the provision of a readout method for such a magneto optical recording medium.

DISCLOSURE OF INVENTION

The above objects are achieved by the invention described below.

According to the invention, there is provided a magneto optical recording medium comprising a substrate and a multilayer recording film comprising essentially a readout layer, an intermediate layer, and a recording layer that are successively formed on top of the substrate and are magnetically coupled with each other, wherein a recorded magnetic domain formed in the recording layer is copied into the readout layer and recorded information is read out by displacing a magnetic domain wall in the readout layer, the medium characterized in that:

at least a part of the recording film lying in a boundary portion between mutually adjacent recording track areas is formed thinner than the recording film lying in center portions of the recording track areas.

The invention also concerns the magneto optical recording medium, wherein at least in a recorded information detection region lying within a reading beam spot, the readout layer has a smaller magnetic domain wall coercivity than the recording layer, while the intermediate layer has a lower Curie temperature than the readout layer and the recording layer, and the mutually adjacent recording tracks are magnetically isolated from each other.

In the magneto optical recording medium of the present invention, the adjacent track areas are isolated from each other without having to apply annealing.

The invention offers the effect of being able to achieve a magneto optical recording medium that allows signals of short mark length to be read out by using a magneto optical readout apparatus employing a DWDD system.

The invention also offers the effect of being able to achieve a magneto optical recording medium that does not need annealing and is therefore inexpensive and easy to manufacture and has a high CNR.

The wording "successively" implies that other layers may be interleaved between the stated layers. Therefore, the wording "successively formed" includes the case where the readout layer, the intermediate layer, and the recording layer are successively formed in this order with another layer sandwiched between the readout layer and the intermediate layer or between the intermediate layer and the recording layer, as well as the case where only the readout layer, the intermediate layer, and the recording layer are successively formed in this order.

The wording "in a recorded information detection region lying within a reading beam spot" means the region of a recording film heated to a readout temperature (for example, 200° C. or higher) by being irradiated by a reading laser beam.

The invention also concerns the magneto optical recording medium, wherein at least a part of the recording film lying in the boundary portion between the mutually adjacent recording track areas is more than 20% thinner than the recording film lying in the center portions of the recording track areas.

The present invention offers the effect of being able to achieve a magneto optical recording medium that is suitable for for readout by a DWDD system since the mutually adjacent recording tracks are isolated from each other without having to apply annealing.

The invention also concerns the magneto optical recording medium, wherein when the beam spot is irradiated on a recording track, a temperature gradient is formed in a widthwise direction of the recording track.

This makes it possible to form an optimum temperature profile (an optimum temperature distribution) for forming a recorded magnetic domain in the recording track, especially within a groove, so that the recorded magnetic domain with a recorded mark shape close to the beam spot shape for readout can be formed.

This makes it possible to achieve the magneto optical recording medium with excellent signal characteristics at the time of recording and reproducing.

The invention concerns the magneto optical recording medium, wherein the magneto optical recording medium includes a land and a groove, and wherein magnetization of the readout layer is cut off at the land formed between the grooves, and only in the groove the recorded magnetic domain formed in the recording layer is copied into the readout layer and the recorded information is read out by displacing the magnetic domain wall in the readout layer.

In the present invention, the groove (recessed portion) and the land (raised portion) are formed on the optical disk substrate, and only the groove is used as the recording track area. The land acts to cut off the magnetic coupling between its adjacent recording track areas.

The present invention offers the effect of being able to achieve a magneto optical recording medium that does not need annealing, is suitable for readout by a DWDD system, and is inexpensive and easy to manufacture.

By using the groove as the recording track area, a magneto optical recording medium can be achieved that is suitable for readout by a DWDD system and capable of providing a stable readout output with a higher CNR than when the land is used as the recording track area.

The "groove" refers to the recessed portion (for example, portions indicated at 2a and 2b in FIG. 1) of the recording film formed with recessed and raised portions on the optical disk substrate, the groove being formed the closer to the optical disk substrate surface. The "land" refers to the raised portion (for example, portions indicated at 3a and 3b in FIG. 1) of the recording film formed with recessed and raised portions on the optical disk substrate, the land being formed the farther from the optical disk substrate surface.

The invention also concerns the magneto optical recording medium, wherein height difference between the land and the groove is within a range of $\lambda/(20n)$ to $\lambda/(3n)$ ($\lambda$ is the wavelength of reading light, and n is the refractive index of the substrate of the magneto optical recording medium).

The invention also concerns the magneto optical recording medium, wherein height difference between the land and the groove is within a range of 20 nm to 80 nm.

In the present invention, a shallow groove (recessed portion) and a low land (raised portion) are formed on the optical disk substrate, and only the shallow groove is used as the recording track area. The low land acts to cut off the magnetic coupling between its adjacent recording track areas.

In the prior art high density magneto optical recording medium (a high density magneto optical recording medium not employing a DWDD system) of the type that cuts off the magnetic coupling between adjacent recording track areas by utilizing the land/groove structure, the recorded signal mark length is made short and the groove depth is increased to increase the cutoff effect.

In the prior art, if the magneto optical recording medium is a medium for recording and reproducing a signal of a mark length of 1 $\mu$m, for example, the groove must be formed with a depth of about 50 nm. If this design philosophy is applied to a magneto optical recording medium for recording and reproducing a signal of a mark length of 0.2 $\mu$m or less, a height difference (groove depth) of 120 nm or larger has had to be physically provided between the land and groove.

If a height difference of 120 nm or larger is actually provided between the land and groove, the output level of the readout signal will drop significantly, making it difficult to secure a sufficient CNR.

In the magneto optical recording medium of the present invention, the height difference between the land and groove is set in the range of 20 nm to 80 nm (or for wavelengths not shorter than the violet laser wavelength (for example, $\lambda$=405 nm), in the range of $\lambda/(20n)$ to $\lambda(3n)$). When the magneto optical recording medium of the present invention is loaded into a magneto optical readout apparatus employing a DWDD system, a readout signal with a high CNR can be obtained since high magnetic isolation is provided between adjacent recording track areas.

The present invention provides a magneto optical recording medium for recording and reproducing a signal of a mark length of 0.2 $\mu$m or less, that has areas where the height difference between the land and groove is optimized to secure a sufficient CNR while reliably cutting off the magnetic coupling between adjacent recording track areas.

The height difference between the land and groove means the groove depth measured from the top (upper surface) of the land to the bottom of the groove.

The invention also concerns the magneto optical recording medium, wherein the land is rectangular, trapezoidal, or inverted-V in shape.

The present invention offers the effect of being able to achieve a magneto optical recording medium that does not need annealing, is suitable for readout by a DWDD system, and is inexpensive and easy to manufacture.

In the magneto optical recording medium of the present invention, the land has a rectangular, trapezoidal, or inverted V shape. Since the structure is such that the thickness of the recording film can be reduced at the junction between the sloping face and planar surface or between the sloping faces, the magnetic coupling between adjacent recording track areas can be reliably cut off.

Especially, in the case of the inverted V-shaped land structure, the magnetic coupling between adjacent recording track areas can be cut off by a narrow land. Accordingly, in a magneto optical recording medium with a particularly narrow track pitch, the structure allows the width of the recording track area to be increased (the width of the land can be reduced) while retaining the same track pitch.

Further, for the same groove depth, a readout signal with a higher level can be obtained from the recording track area (groove) on the magneto optical recording medium if the inverted V-shaped land structure is employed.

The invention also concerns the magneto optical recording medium, wherein at least either a planar portion or sloping portion of the land formed between the grooves has a larger surface roughness than a groove surface where an information signal is recorded.

In the present invention, by making the surface roughness of the planar portion or other portion of the land larger than the surface roughness of the groove surface, the magnetic coupling cutoff effect at the land can be increased.

That is, by employing the land structure of increased surface roughness in conjunction with other structure, the magnetic coupling cutoff effect at the land can be further increased.

The present invention offers the effect of being able to achieve a magneto optical recording medium in which the magnetic coupling between adjacent recording tracks is cut off. The invention also has the effect of being able to achieve a magneto optical recording medium in which the magnetic coupling between adjacent recording tracks is cut off by a narrower land. It also has the effect of reducing the ghost.

The invention also concerns the magneto optical recording medium, wherein the surface roughness of at least either the planar portion or the sloping portion of the land formed between the grooves is 1.5 nm or larger.

The invention also concerns the magneto optical recording medium, wherein the surface roughness of the groove for recording the information signal is 1.5 nm or smaller.

The present invention offers the effect of being able to achieve a magneto optical recording medium in which the surface roughness of the land is increased to increase the magnetic coupling cutoff effect and the surface roughness of the groove reduced so that a readout signal with a high output level and a high CNR can be obtained from the groove.

In this specification, the surface roughness is measured by AFM, unless otherwise noted expressly.

The invention also concerns the magneto optical recording medium, wherein the track pitch of the mutually adjacent recording track areas where recorded magnetic domains are formed is 1.0 $\mu$m or less.

The present invention offers the effect of being able to achieve a narrow track pitch magneto optical recording medium having the above structure.

With the above structure, the invention offers the effect of being able to achieve a magneto optical recording medium capable of recording and reproducing a signal of a mark length of 0.2 $\mu$m or less at a track pitch of 1.0 $\mu$m or less.

The "track pitch" refers to the center-to-center distance between mutually adjacent recording track areas. In FIG. 1, length 7+length 8=track pitch.

The invention also concerns the magneto optical recording medium, wherein the width of a groove where recorded magnetic domains are formed is not smaller than 0.2 $\mu$m but not larger than 0.8 $\mu$m.

The invention also concerns the magneto optical recording medium, wherein the width of a land formed between grooves where recorded magnetic domains are formed is not smaller than 0.05 $\mu$m but not larger than 0.3 $\mu$m.

The present invention offers the effect of being able to achieve a high density magneto optical recording medium of an optimum format that has a land for cutting off the magnetic coupling between recording track areas formed adjacent to each other at a track pitch of 1.0 $\mu$m or less and a groove that allows readout of a signal of a mark length of 0.2 $\mu$m or less.

In FIG. 1, (height 5+height 6) indicates the height difference between the top of the land 3a, 3b (the bottom of the inverted trapezoid in FIG. 1) and the bottom of the groove 2a, 2b, and the height 5 and height 6 are equal to each other. The point at which the height 5 contacts the height 6 is called the half-width point.

The length 7 measured by reference to the half-width point is the width of the land 3a, 3b, and likewise, the length 8 measured by reference to the half-width point is the width of the groove 2a, 2b.

In this specification as well as the appended claims, "the width of the land" and "the width of the groove" are the half-width measured as described above.

The invention also concerns the magneto optical recording medium, wherein the land formed between the grooves where magnetic domains are formed includes a sloping portion whose slope angle is not smaller than 40 degrees but not larger than 70 degrees.

In the magneto optical recording medium, the larger the slope angle of the land, the more effectively the magnetic coupling between adjacent recording tracks is cut off. However, if the slope angle is too large, it becomes difficult to separate the optical disk substrate from the stamper, and the productivity degrades.

According to the present invention, a magneto optical recording medium can be achieved that has good signal characteristics, and that facilitates optical disk mastering (cutting of a master optical disk) when producing stampers, and also facilitates the production of stampers and the fabrication of optical disk substrates by injection molding.

The invention thus offers the effect of being able to achieve a magneto optical recording medium that does not need annealing, is suitable for readout by a DWDD system, and is inexpensive and easy to manufacture, while achieving high productivity for the optical disk substrate and, at the same time, ensuring an effectively cutoff of the magnetic coupling between adjacent recording track areas.

The "slope angle" refers to the angle of the sloping face relative to the plane surface of the optical disk substrate (for example, when the slope angle is 90 degrees, the sloping face is perpendicular to the groove).

The invention also concerns the magneto optical recording medium, wherein magnetic anisotropy in a portion of the recording film formed on the land is smaller than the magnetic anisotropy in the groove.

The invention also concerns the magneto optical recording medium, wherein a portion of the recording film formed on the land is heat treated or annealed.

The invention also concerns the magneto optical recording medium, wherein a region heat treated by irradiating laser light is formed on the land.

In the magneto optical recording medium of the present invention, adjacent recording tracks are magnetically isolated from each other by reducing the thickness of the recording film at both sides of the recording track (near the boundary portions adjacent to other recording tracks) compared with the thickness of the recording film at the center of the recording track and by reducing the magnetic anisotropy of the land at the same time. The present invention thus offers the effect of being able to achieve a magneto optical recording medium that is suitable for signal readout by a DWDD system since the mutually adjacent recording tracks are magnetically isolated from each other.

Here, the magnetic anisotropy of the land can be reduced by annealing the land by applying laser light.

By reducing the thickness of the recording film at both sides of the recording track compared with the thickness of the recording film at the center thereof, the adjacent recording tracks are magnetically isolated from each other to a certain degree; as a result, annealing can be accomplished (within a short time) by applying a low power laser light while rotating the optical disk at high speed.

Furthermore, with the structure where the thickness of the recording film at both sides of the recording track are reduced compared with the thickness of the recording film at the center thereof, annealing enhances the magnetic cutoff effect effectively by reducing the magnetic anisotropy of the land to a certain degree and the mutually adjacent recording tracks can be magnetically isolated from each other.

Furthermore, in the case when thermal conductivity of the recording film in the land is changed by annealing, better temperature distribution can be obtained in the width direction of the recording track in the laser spot which is irradiated on the recording track. Consequently, the recorded magnetic domain with a recorded magnetic domain shape close to the beam spot shape is formed so that a magneto optical recording medium can be achieved in which magnetic domain wall is displaced in more stable manner.

The invention also concerns the magneto optical recording medium, wherein the optical disk substrate is formed with pre-pits.

In the present invention, pre-pits employed in conventional ROM type media are formed on the recordable optical recording medium. This offers the effect of being able to achieve a magneto optical recording medium that allows tracking control, address detection, etc. utilizing the pre-pits.

The invention also concerns the magneto optical recording medium, wherein the depth of each of the pre-pits is within a range of $\lambda/(20n)$ to $\lambda/(3n)$ ($\lambda$ is the wavelength of reading light, and n is the refractive index of the substrate of the magneto optical recording medium).

The present invention offers the effect of being able to achieve a magneto optical recording medium that can provide a large pre-pit detection signal, and that has pre-pits whose depth is almost the same as the groove depth, ensuring high productivity.

Preferably, the depth of each pre-pit is made equal to the depth of the groove.

The depth of the "pre-pit" refers to the depth measured from the periphery (at the same height as the upper surface of the land) of the pre-pit to the bottom of the pre-pit.

The invention also concerns the magneto optical recording medium, wherein the width of each of the pre-pits is not smaller than 0.2 μm but not larger than 0.8 μm.

The present invention offers the effect of being able to achieve a magneto optical recording medium that has recording track areas formed adjacent to each other at a particularly small track pitch of 1.0 μm or less, and that has an optimum pre-pit width with which a large pre-pit signal can be steadily obtained.

Preferably, the width of each pre-pit is made equal to the width of the groove.

The width of the "pre-pit" refers to the width of the pre-pit measured at the midpoint between the upper surface of the land and the bottom surface of the pre-pit (that is, the width is measured by reference to the same point used for the measurement of the land width and groove width).

The invention also concerns the magneto optical recording medium, wherein the magneto optical recording medium further includes a control layer for suppressing magnetic domain wall displacement in the readout layer.

With the provision of the control layer, the present invention offers the effect of being able to achieve a magneto optical recording medium that allows the recorded magnetic domain in the recording layer to be copied as a copied magnetic domain in the readout layer by expanding the magnetic domain, while reducing ghosts.

The invention also concerns the magneto optical recording medium, wherein the readout layer has a multilayered structure.

The invention also concerns the magneto optical recording medium, wherein the readout layer is constructed from multiple layers having different Curie temperatures or different compensation composition temperatures.

The present invention offers the effect of being able to achieve a magneto optical recording medium that allows the recorded magnetic domain in the recording layer to be copied as a copied magnetic domain in the readout layer by further expanding the magnetic domain.

The invention also concerns the magneto optical recording medium, wherein the readout layer is a magnetic layer containing at least one element selected from the group consisting of Al, Ti, Cr, and Si.

The present invention offers the effect of being able to achieve a magneto optical recording medium that is suitable for readout by a DWDD system, ensuring a high magnetic domain wall mobility in the readout layer by containing Al, etc. in the readout layer.

The invention also concerns the magneto optical recording medium, wherein the recording film includes a land and a groove, and at least in a recorded information detection region lying within a reading beam spot, the readout layer has a smaller magnetic domain wall coercivity than the recording layer, while the intermediate layer has a lower Curie temperature than the readout layer and the recording layer, and only in the groove or the land, the recorded magnetic domain formed in the recording layer is copied into the readout layer and the recorded information is read out by displacing the magnetic domain wall in the readout layer.

The present invention has a structure in which the land and groove are formed on the magneto optical recording medium and magnetization is cut off at the boundary between the land and the groove.

The recording track area may be provided only in the groove or only in the land. Preferably, the recording track area is provided in the groove where a stable readout output with a high CNR can be obtained.

The present invention thus offers the effect of being able to achieve a magneto optical recording medium that does not need annealing, is suitable for readout by a DWDD system, and is inexpensive and easy to manufacture.

According to the invention, there is provided a manufacturing method for a magneto optical recording medium comprising an optical disk substrate and a multilayer recording film comprising essentially a readout layer, an intermediate layer, and a recording layer successively formed on top of said optical disk substrate, the manufacturing method comprising the step of:

placing, within a vacuum chamber, a target and the optical disk substrate in a position opposite the target, and forming at least a portion of the recording film by magnetron-sputtering the target onto the optical disk substrate that is held stationary or is being rotated on its axis.

In the prior art manufacturing method for a magneto optical recording medium, the recording film was deposited by magnetron sputtering on a rotating optical disk substrate while moving the center of the optical disk substrate so that the recording film was formed to a uniform thickness.

The manufacturing method for a magneto optical recording medium according to the present invention is based on a concept entirely different from that of the prior art, and the recording film is deposited by magnetron sputtering while holding the center of the optical disk substrate fixed in position so that the recording film is formed with determined thickness distribution in a groove. With this method, a magneto optical recording medium can be fabricated that has a recording film whose thickness is reduced along the boundary between adjacent recording tracks so that the adjacent recording tracks are magnetically isolated from each other.

The invention also concerns the manufacturing method for a magneto optical recording medium, comprising the step of placing, within the vacuum chamber, a target made of an alloyed material having a composition for forming each layer of the recording film and the optical disk substrate in a position opposite the target, and forming at least a portion of the recording film by magnetron-sputtering the target onto the optical disk substrate that is held stationary or is being rotated on its axis.

The present invention offers the advantage of being able to achieve a method for manufacturing a magneto optical recording medium in which the magnetic coupling between adjacent recording track areas is reliably cut off, by performing magnetron sputtering using a target made of a single alloyed material. Typically, for each layer of the recording film, magnetron sputtering is performed using a target made of a single alloyed material (the alloyed material used as the target or its composition differs for each layer).

In the prior art manufacturing method, the recording film was deposited to a uniform thickness on the optical disk substrate by performing magnetron sputtering using a plurality of targets while moving the center of the optical disk substrate. By contrast, in the manufacturing method of the present invention, magnetron sputtering is performed using a single target while holding the center of the optical disk substrate fixed in position. As a result, the deposited recording film has a reduced thickness on the sloping portion between the groove and land. This is because the sloping face is less likely to be bombarded with the atoms released from said target because of the angle of the particles being sputtered.

The invention also concerns the manufacturing method for a magneto optical recording medium, comprising the step of sequentially placing, within the vacuum chamber, a plurality of targets made of materials having compositions for forming the layers of the recording film and the optical disk substrate in a position opposite the target, and forming the layers of the recording film on the monoatomic scale (which means "forming the layer by piling up very thin layers, each of which is composed of elements of each target, thereby achieving the desired composition of the layer in total.") or with the monoatomic thickness by sequentially magnetron-sputtering the targets onto the optical disk substrate that is held stationary or is being rotated on its axis.

The present invention offers the advantage of being able to achieve a method for manufacturing a magneto optical recording medium that has a large anisotropy (mainly magnetic anisotropy) (achieving a high magnetic domain wall mobility since the coupling between adjacent tracks is weak in the readout layer) by performing magnetron sputtering using plural targets of different materials.

The targets of different materials may be prepared one for each element.

According to the invention, there is provided a readout method for a magneto optical recording medium in which a recorded magnetic domain formed in a recording layer is copied into a readout layer and recorded information is read out by displacing a magnetic domain wall in the readout layer, the readout method comprising a readout step comprising:

irradiating a laser beam spot onto the magneto optical recording medium through the readout layer and, while applying tracking control by utilizing light reflected from the magneto optical recording medium, moving the laser beam spot relative to the magneto optical recording medium, thereby forming a temperature profile having a gradient along the moving direction of the laser beam spot, the temperature profile having a temperature region where a force generated based on the temperature profile and acting to displace the magnetic domain wall formed in the readout layer toward a higher temperature direction is greater than a coupling force acting via an intermediate layer between a magnetic domain in the recording layer and a magnetic domain in the readout layer, and forming within the laser beam spot a copied magnetic domain in the readout layer for holding the information copied from the recording layer, the copied magnetic domain being expanded by displacing the magnetic domain wall in the readout layer, and detecting the information from the copied magnetic domain in the form of a change in the polarization plane of the reflected light of the laser beam spot.

The present invention concerns a readout method for reading a magneto optical recording medium by a DWDD system while applying tracking control by utilizing the reflected light from the magneto optical recording medium.

Since magneto optical recording media using DWDD system for readout contain recording track areas with a very narrow track pitch, tracking control has been difficult, but if pre-pits are provided on the magneto optical recording medium, for example, tracking control can be performed by using the reflected light from the magneto optical recording medium.

The present invention thus provides a readout method for reading a magneto optical recording medium from which recorded information can be read out while applying stable tracking control, by utilizing the reflected light from the magneto optical recording medium not only for signal readout but also for tracking control.

The present invention offers the effect of being able to achieve a readout method for a magneto optical recording medium by a DWDD system that enables a tracking control method inexpensive and easy to implement.

The "relative movement" of the laser beam spot can be accomplished in any suitable way. For example, a disk-shaped magneto optical recording medium may be rotated, or the optical pickup for irradiating the laser beam spot may be moved, or a belt-like magneto optical recording medium may be moved along its longitudinal or rotational direction.

The invention also concerns the read out method for a magneto optical recording medium, wherein in the readout step, the recorded magnetic domain copied in stepwise manner in a depth direction of the readout layer is expanded in size by displacing the magnetic domain wall, thereby allowing the detection of the information.

The present invention can achieve a higher domain mobility within the readout layer by copying the magnetic domain, for example, in stepwise manner between the plurality of layers in the readout layer.

This includes the case where the composition of the readout layer is varied without forming distinct layers therein and the magnetic domain is copied in stepwise manner while being expanded.

The present invention offers the effect of being able to achieve a readout method for a magneto optical recording medium that can read out a signal of short mark length in a stable manner.

The wording "copied in stepwise manner in a depth direction of the readout layer" means that the copying is performed in stepwise manner between the plurality of layers in the readout layer.

This means that the readout layer is formed from a multilayered structure comprising thin layers of compositions differing slightly from one layer to another, or from a structure incorporating a composition gradient.

According to the invention described in claim 33, there is provided a readout apparatus for a magneto optical recording medium in which a recorded magnetic domain in a recording layer is copied into a readout layer to form a copied magnetic domain therein and recorded information is read out by displacing a magnetic domain wall of the copied magnetic domain, the readout apparatus comprising:

heating means for forming a temperature profile having a gradient along a moving direction of a laser beam spot by moving the laser beam spot relative to the magneto optical recording medium during readout;

tracking control part for applying tracking control by utilizing light of the laser beam spot reflected from the magneto optical recording medium; and a detection device for detecting the recorded information from the copied magnetic domain in the form of a change in the polarization plane of the reflected light of the laser beam spot, the copied magnetic domain being formed within the laser beam spot and expanded by displacing the magnetic domain wall.

The present invention offers the effect of being able to achieve a readout apparatus for a magneto optical recording medium that can read out a signal of short mark length by using a DWDD method while applying tracking control by utilizing the reflected light from the magneto optical recording medium.

The novel features of the invention will be hereinafter fully described and particularly pointed out in the appended claims, and the construction and details of the invention, together with other objects and features thereof, will become better understood and appreciated by reference to the following detailed description when considered in conjunction with the accompanying drawings.

It will be appreciated that all or part of the drawings are purely diagrammatic for illustrative purposes and do not necessarily present faithful depictions of the actual relative sizes and positions of the illustrated elements.

BEST MODE FOR CARRYING OUT THE INVENTION

Embodiments illustrating the best mode for carrying out the invention will be described below by way of example with reference to the accompanying drawings. It will, however, be noted that the invention is not limited to the specific embodiments described herein, and that any modifications or changes may be made without departing from the spirit and scope of the invention.

Embodiment 1

A first embodiment of the present invention will be described in detail below with reference to drawings.

Figure 1:
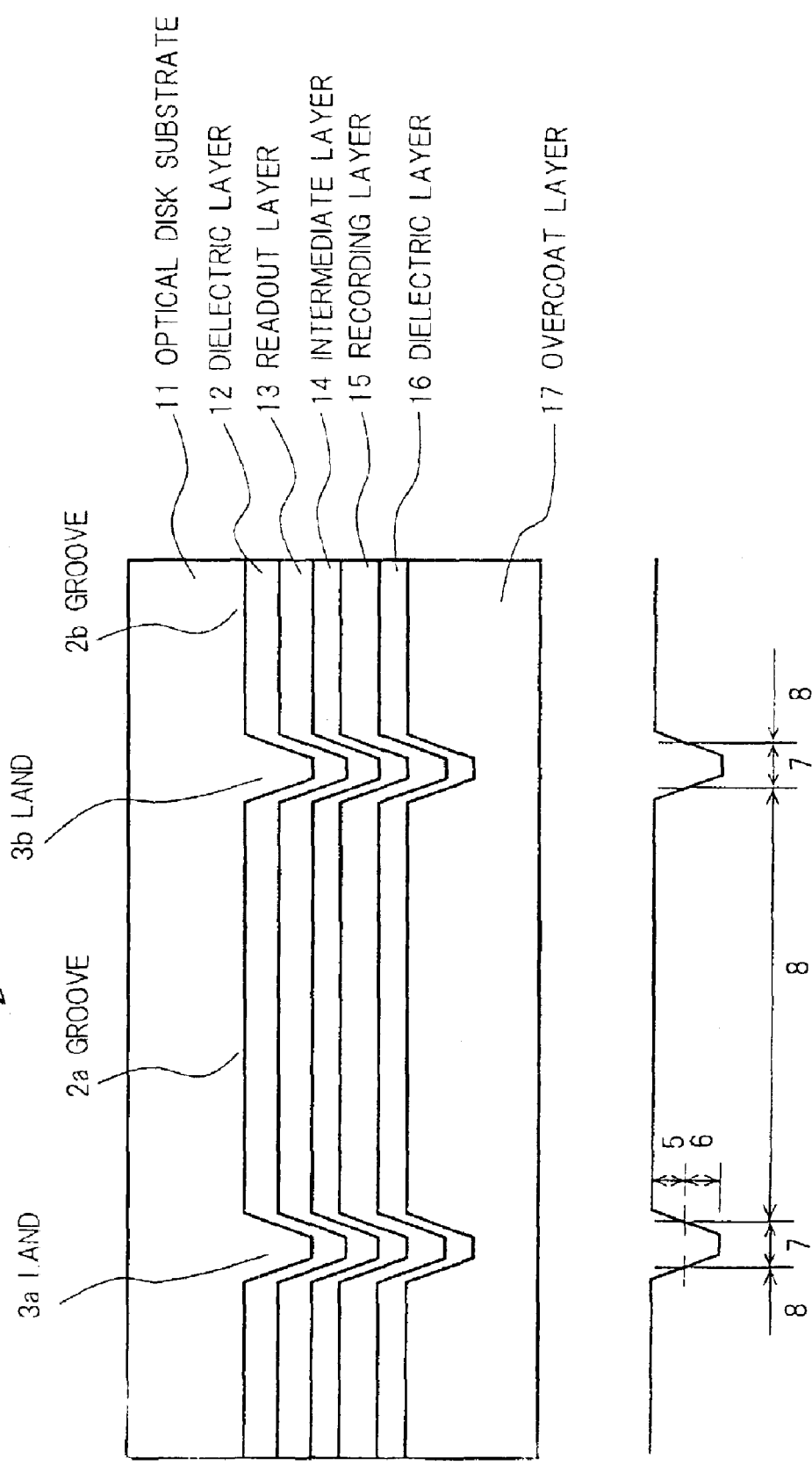
FIG. 1 is a cross sectional view showing the structure of a magneto optical recording medium according to a first embodiment of the present invention.
Figure 2:
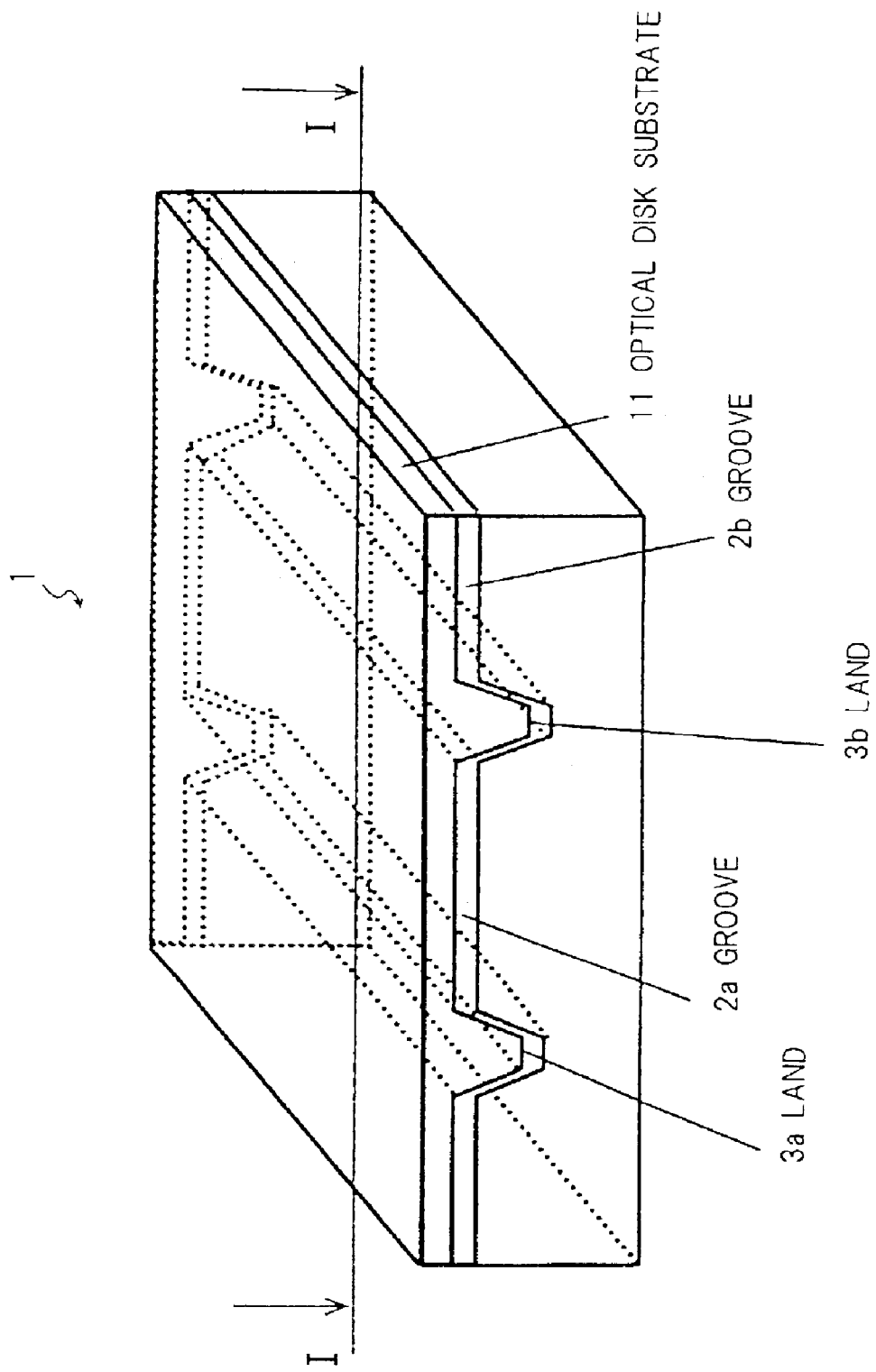
FIG. 2 is a perspective view showing a cross sectional structure of the magneto optical recording medium according to the first embodiment of the present invention.

FIG. 1 is a cross sectional view showing the structure of a magneto optical recording medium (magneto optical disk) according to the first embodiment of the present invention, and FIG. 2 is a perspective view showing the structure of the magneto optical recording medium according to the first embodiment of the present invention.

FIG. 1 shows the cross section of the disk-shaped magneto optical disk (magneto optical recording medium) cut along the radial direction thereof. Grooves 2a and 2b which form recording track areas extend, one adjacent to the other, in a direction perpendicular to the plane of FIG. 1; the recording track areas spiral outward from the inner diameter of the magneto optical disk.

The cross section shown in FIG. 1 is taken along line I—I in FIG. 2.

In this specification as well as in the appended claims, the side nearer to the optical disk substrate 11 is called the lower side. The grooves 2a and 2b are so called because they are formed nearer to the optical disk substrate 11.

In FIG. 1, reference numeral 11 is the optical disk substrate formed from a transparent polycarbonate, and 12 is a dielectric layer provided to protect a recording film and to adjust the optical properties of the medium. A readout layer 13 for detecting information by utilizing the displacement of magnetic domain walls, an intermediate layer 14 for controlling the exchange coupling between the readout layer and recording layer, and the recording layer 15 for holding recorded information therein, together constitute a multi-layer recording film. Further, reference numeral 16 is a dielectric layer for protecting the recording film, and 17 is an overcoat layer.

The magneto optical recording medium of the first embodiment of the invention shown in FIGS. 1 and 2 has the structure that allows the use of a DWDD system for information readout in which the magnetic domain wall coming into the spot of the reading light beam is sequentially displaced in the readout layer and information is detected from the magnetic domain expanded by the displacement of the magnetic domain wall, thereby achieving super resolution readout exceeding the detection limit determined by the wavelength of the reading light and the numerical aperture of the objective lens.

The multilayer recording film of the above structure is one example to which DWDD (Domain Wall Displacement Detection) method, a method that amplifies the amplitude of readout signals by using the displacement of magnetic domain walls, can be applied. Any magnetic film structure that allows the use of the DWDD method for information readout can be used for the recording film of the magneto optical recording medium of the present invention. For example, as with the one described in Japanese Unexamined Patent Publication No. Hei6-290496, the recording film of the magneto optical recording medium of the present invention comprises the recording layer which is a magnetic film having a large coercivity, the readout layer which is a magnetic film having a coercivity small enough to allow magnetic domain wall displacement, and the intermediate layer which is a magnetic film having a relatively low Curie temperature and used for switching.

The basic principle of the above DWDD readout method will be described with reference to FIGS. 3 and 4.

FIG. 3(a) is a diagram showing a cross section of the recording film of the disk which is rotated. The recording film comprising three layers, i.e., the readout layer 13, intermediate layer 14, and recording layer 15, is formed on top of the substrate (not shown) and dielectric layer 12, and on top of the recording film is formed the dielectric layer 16 which is covered by a protective coat layer (not shown) of a UV curing resin.

The readout layer is formed from a magnetic film material having a small magnetic domain wall coercivity, and the intermediate layer is formed from a magnetic film having a low Curie temperature, while the recording layer is formed from a magnetic film that can hold recorded domains even if the domain size is small. In the prior art magneto optical recording medium, the readout layer had a domain structure containing unclosed magnetic domain walls between adjacent tracks by forming a guard band, etc. by applying annealing.

As shown, the information signal is recorded in the form of a recorded magnetic domain in the recording layer by thermal magnetic recording. In the recording film at room temperature when not irradiated by a laser beam spot (light beam spot 5), the recording layer, intermediate layer, and readout layer are strongly exchange-coupled with each other, so that the recorded magnetic domain in the recording layer is directly copied into the readout layer, forming a copied domain in the readout layer.

FIG. 3(b) shows the relationship between the temperature T of the recording film and the position x corresponding to the position in the cross sectional diagram of (a). As shown, when reading a recorded signal, the magneto optical disk (magneto optical recording medium) is rotated and the reading beam spot formed by a laser beam is irradiated along the track.

The position x indicates the position on the magneto optical disk, and the x axis extends along the track on the magneto optical disk.

Figure 3:
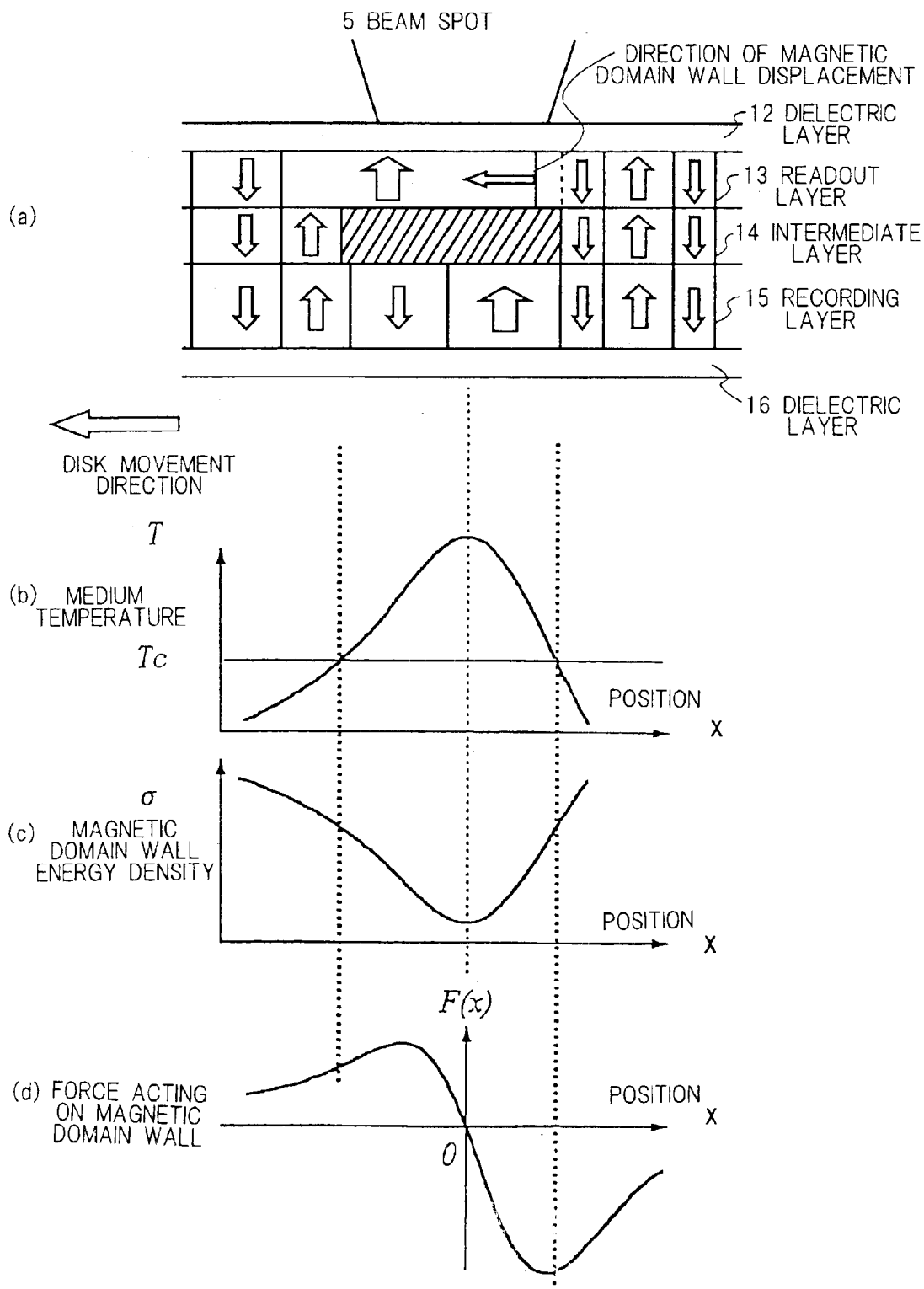
FIG. 3 is a cross sectional view of the magneto optical recording medium for explaining the readout operation of the magneto optical recording medium according to the first embodiment of the present invention: part (a) is a cross sectional view showing the structure of a recording film (specifically, the direction of magnetization) of the magneto optical recording medium, part (b) is a characteristic diagram showing the temperature profile formed in the magneto optical recording medium at the readout position, part (c) is a characteristic diagram showing the magnetic domain wall energy density of the readout layer, and part (d) is a characteristic diagram depicting a force acting to move a magnetic domain wall in the readout layer.

Assuming that the light beam spot 5 is stationary, the magneto optical disk moves relative to the spot in the direction from right to left in FIG. 3 (the positive to negative direction on the x axis).

Typically, the magneto optical disk moves by being rotated.

On the other hand, when it is assumed that the magneto optical disk is stationary, the light beam spot moves relative to the disk in the direction from left to right in FIG. 3 (in the negative to positive direction on the x axis).

At this time, the recording film exhibits a temperature profile such as shown in FIG. 3(*b*), forming in the intermediate layer a temperature region where the temperature is higher than its Curie temperature Tc; in this temperature region, the intermediate layer acts to cut off the exchange coupling between the readout layer and recording layer.

When the reading beam is irradiated, the magnetic domain wall energy density σ which is dependent on temperature shows a magnetic energy profile (magnetic energy distribution) such as shown in FIG. 3(*c*). That is, because of the gradient of the magnetic domain wall energy density σ as shown in FIG. 3(*c*), a magnetic domain wall driving force F is exerted on the magnetic domain wall in each layer at the position x, as shown in FIG. 3(*d*).

The force F acting on the recording film is proportional to the derivative of the magnetic domain wall energy density, and acts to displace the magnetic domain wall in the higher to lower direction of the magnetic domain wall energy density σ, as shown in FIG. 3(*d*).

In FIG. 3(*d*), when F(x)>0, the force F acts in the negative to positive direction on the x axis, and when F(x)<0, the force F acts in the positive to negative direction on the x axis.

The readout layer 13 has a small magnetic domain wall coercivity, and hence, a large magnetic domain wall mobility; therefore, in the readout layer 13 alone when it contains an unclosed magnetic domain wall (in the region where the intermediate layer 14 is heated above its Curie temperature Tc), the magnetic domain wall is easily displaced by the force F.

As a result, the region of the readout layer 13 which contacts the region where the intermediate layer 14 is heated above its Curie temperature Tc becomes a substantially single wide magnetic domain. Information held in the magnetic domain contacting the front end of the region where the intermediate layer 14 is heated above its Curie temperature Tc is copied into the substantially single wide magnetic domain.

As shown in FIG. 3(*b*), the temperature profile of the recording film is nonsymmetric. The temperature gradient along the position x gently slopes off from the temperature peak position toward the rear end of the light beam spot 5, and steeply slopes off from the temperature peak position toward the front end of the spot (here, the moving direction of the light beam spot 5 is the "front end" direction, and the moving direction of the magneto optical recording medium is the "read end" direction). The force F acting to expand the magnetic domain is larger in the front end region where the gradient is steep, so that the wall of the magnetic domain contacting the front end of the region where the temperature is higher that the Curie temperature Tc is instantaneously displaced toward the rear end of the region, thus forming a single wide magnetic domain (with the force F overcoming the coupling force between the respective magnetic domains in the recording layer 15, intermediate layer 14, and readout layer 13).

Accordingly, when the magneto optical recording medium is moved relative to the spot, and the magnetic domain contacting the front end of the region of the intermediate layer 14 where the temperature is higher than the Curie temperature Tc is replaced by a new magnetic domain, the magnetic domain wall in the readout layer 13 is instantaneously displaced toward the rear end of the region where the intermediate layer is heated above its Curie temperature Tc, as shown by arrow in FIG. 3(*a*). Then, the magnetization of the readout layer 13 within the reading beam spot is aligned in the same direction in the wide region.

As a result, even if the recorded domain in the recording layer 15 is very small, since the domain as large as the region where the intermediate layer 14 is heated above its Curie temperature Tc is formed within the readout layer 13, a readout signal of amplitude greater than a certain level can be obtained.

However, the prior art DWDD system has had the problem that a guard band or the like must be formed between tracks by annealing in order to form a readout layer having a domain structure containing unclosed magnetic domain walls and acting to cut off the exchange coupling between adjacent tracks.

Figure 4:
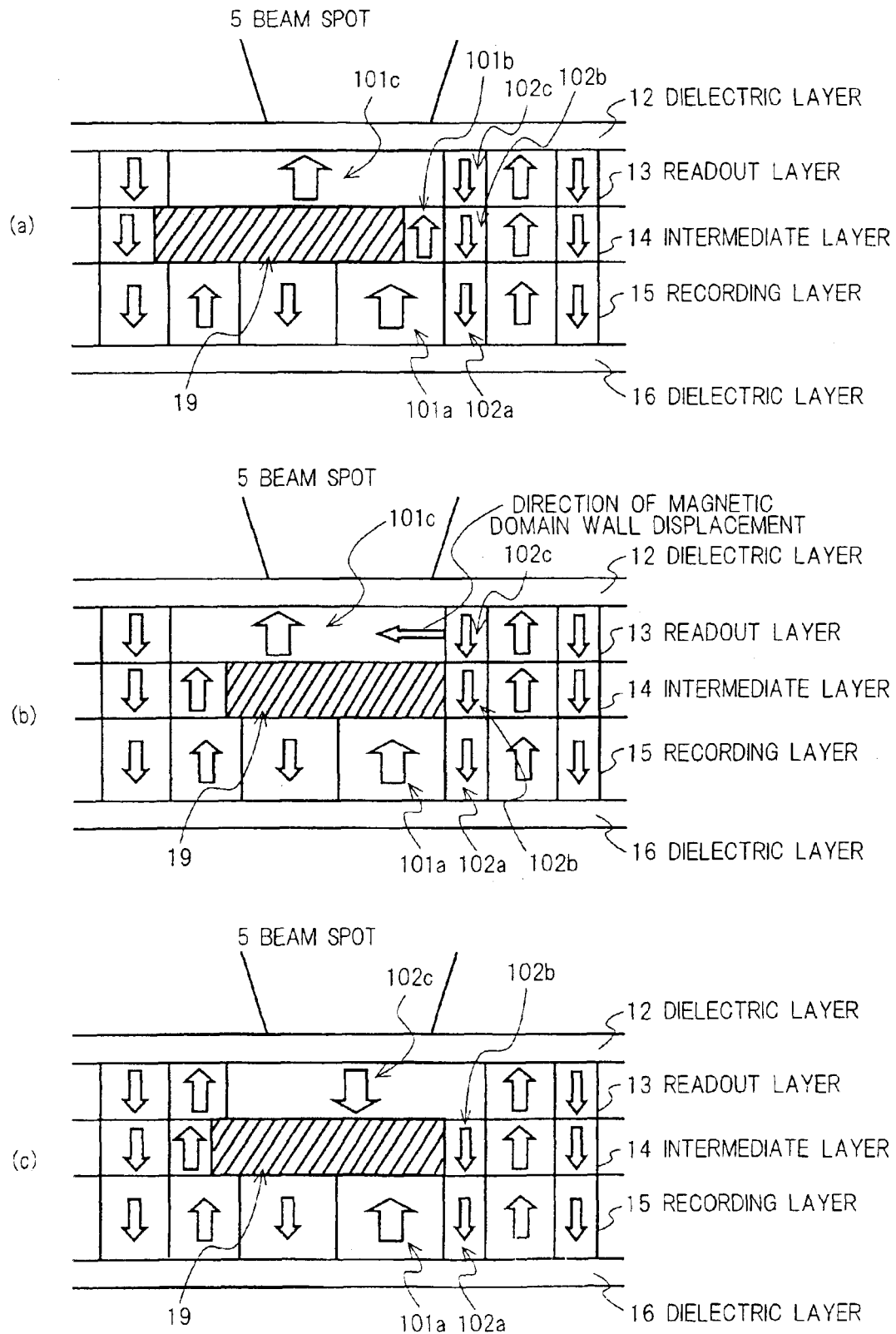
FIG. 4 is a diagram showing how magnetic domains in the recording film change in accordance with the relative movement of the magneto optical recording medium according to the first embodiment of the present invention.

FIG. 4 is a diagram showing how the magnetic domains in the recording film change with the relative movement of the magneto optical recording medium according to the first embodiment of the present invention.

In FIG. 4(*a*), the recorded magnetic domain 101*a* in the recording layer 15 is coupled with the copied magnetic domain 101*c* in the readout layer 13 via the magnetic domain 101*b* in the intermediate layer 14.

The magnetic domain 101*b* in the intermediate layer 14 is adjacent to the front end of the region 19 where the temperature is higher than the Curie temperature. In the readout layer 13 above the region where the temperature is higher than the Curie temperature, the wall of the copied magnetic domain 101*c* is displaced, thus expanding the copied magnetic domain 101*c* over the region where the temperature is higher than the Curie point.

In this condition, information in the copied magnetic domain 101*c* is read out by the light beam spot 5.

Next, in FIG. 4(*b*), the magneto optical recording medium is moved relative to the light beam spot, and the recorded magnetic domain 101*a* is now positioned under the region of the intermediate layer 14 where the temperature is higher than the Curie temperature, as a result of which the magnetic domain in the intermediate layer 14 coupled with the recorded magnetic domain 101*a* disappears. Instead, the recorded magnetic domain 102*a* is now coupled with the copied magnetic domain 102*c* in the readout layer 13 via the magnetic domain 102*b* in the intermediate layer 14.

The magnetic domain 102*b* in the intermediate layer 14 is adjacent to the front end of the region 19 where the temperature is higher than the Curie temperature. In the readout layer 13 above the region where the temperature is higher than the Curie temperature, the wall of the copied magnetic domain 102*c* is instantaneously displaced in the direction shown in the diagram, thus expanding the copied domain 102c. That is, the copied domain 101c is instantaneously shrunk.

As a result, in FIG. 4(c), in the readout layer 13 above the region where the temperature is higher than the Curie temperature, since the wall of the copied magnetic domain 102c is displaced, as just described, the copied magnetic domain 102c is expanded over the region where the temperature is higher than the Curie point.

In this condition, information in the copied magnetic domain 102c is read out by the light beam spot 5.

The transition from FIG. 4(a) to FIG. 4(b) takes a very brief period of time, but it should be noted that the transition from FIG. 4(b) to FIG. 4(c) is done almost instantaneously, forming one copied domain after another.

The above has described the way how the domains in the recording film change with the displacement of magnetic domain walls caused by the relative movement of the magneto optical recording medium in the DWDD system.

Next, a description will be given of the structure of the magneto optical recording medium 1 according to the first embodiment of the present invention.

As shown in FIG. 1, the magneto optical recording medium 1 of the first embodiment comprises the multilayer recording film, containing the above-described magnetic films, formed on the optical disk substrate 11.

The optical disk substrate 11 is formed with lands 3a and 3b on both sides the groove 2a; the grooves 2a and 2b are formed to a depth h which measures 60 nm from the upper surface of the lands 3a and 3b. With the provision of the lands, the grooves 2a and 2b are magnetically independent of each other. The track pitch of the magneto optical recording medium of this embodiment is 0.7 µm, and the groove width is 0.5 µm.

A method of manufacturing the magneto optical recording medium 1 of the first embodiment will be described next with reference to FIGS. 1 and 2.

First, the transparent optical disk substrate 11 of polycarbonate formed with grooves and lands is produced. The optical disk substrate 11 may be formed with pre-pits such as address pits.

Next, a B-doped Si target is placed in a DC magnetron sputtering chamber and, after fixing the optical disk substrate 11 to a substrate holder, the chamber is evacuated and exhausted by a cryopump until the pressure is brought down to $1 \times 10^{-5}$ Pa or less. With the chamber kept evacuated and exhausted, Ar gas and $N_2$ gas are introduced into the chamber until the pressure rises to 0.3 Pa, and while rotating the substrate, an SiN layer as the dielectric layer 12 is formed to a thickness of 80 nm by reactive sputtering.

Next, with the chamber kept evacuated and exhausted as described above, Ar gas is introduced into the chamber until the pressure rises to 0.4 Pa, and while rotating the substrate, the following layers are formed one on top of another by DC magnetron sputtering: first, the readout layer 13 of GdFeCoCr is formed to a thickness of 30 nm on the dielectric layer 12 by using Gd, Fe, Co, and Cr targets, then the intermediate layer 14 of TbDyFe is formed to a thickness of 10 nm by using Tb, Dy, and Fe targets, and finally the recording layer 15 of TbFeCo is formed to a thickness of 50 nm by using Tb, Fe, and Co targets.

Here, the film composition of each layer can be adjusted to the desired composition by adjusting the charging power ratio of the respective targets.

Next, a B-doped Si target is mounted, and Ar gas and $N_2$ gas are introduced into the chamber until the pressure rises to 0.3 Pa, and while rotating the substrate, the second dielectric layer 16 of SiN is formed to a thickness of 80 nm by reactive sputtering.

Next, an epoxy acrylate based resin is applied on the dielectric layer 16, and the overcoat layer 17 is formed to a thickness of 6 µm by spin coating; the overcoat layer 17 is cured by irradiating it with a UV lamp.

Here, the GdFeCoCr readout layer 13 has a compensation composition temperature of 150° C. and a Curie temperature of 270° C., while the TbDyFe intermediate layer 14 has a Curie temperature of 150° C. and, below the Curie temperature, the rare earth metal composition is always dominant. On the other hand, the TbFeCo recording layer 15 is constructed to have a compensation composition temperature of 80° C. and a Curie temperature of 290° C. by setting the charging power of the respective targets and thereby adjusting its composition.

As previously noted, in FIG. 1, the grooves 2a and 2b forming the recording track areas extend, one adjacent to the other, in a direction perpendicular to the plane of FIG. 1.

As shown in FIGS. 1 and 2, the recording track areas 2a and 2b are each formed in the shape of a groove, one adjacent to the other in the widthwise direction, and the lands 3a and 3b formed between the adjacent recording track areas 2a and 2b separate the information recording track areas 2a and 2b from each other.

In the magneto optical recording medium 1 having the above structure, since the mutually adjacent grooves 2a and 2b are magnetically isolated from each other by the lands 3a and 3b, making each recorded-information holding groove independent of the other, the magnetic domain wall of the copied magnetic domain can be easily displaced in the readout layer within the groove, and information can be read out using the previously described DWDD method.

Figure 5:
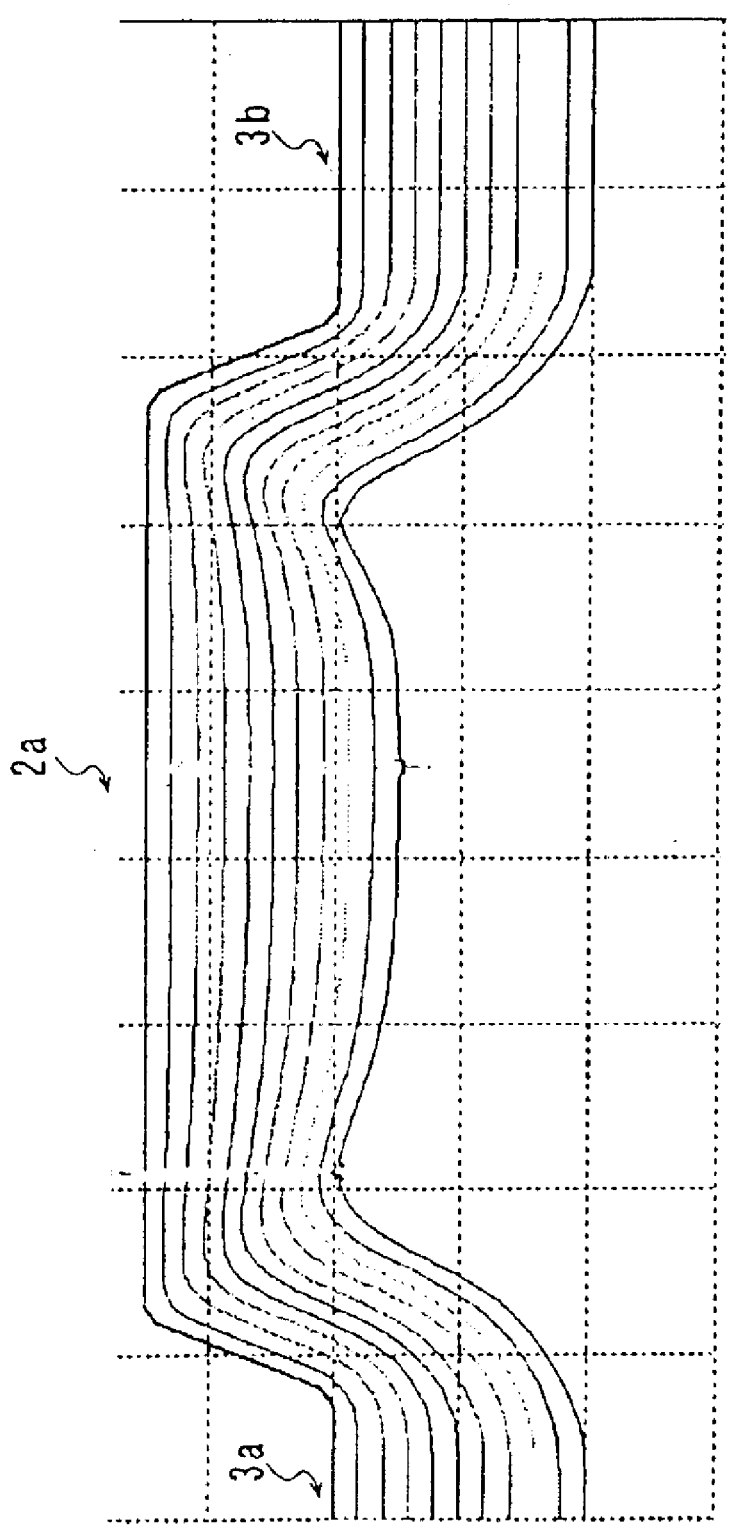
FIG. 5 is a cross sectional view schematically showing through simulation the recording film formed within a groove according to the first embodiment of the present invention.

FIG. 5 is a cross sectional view schematically showing through simulation the formation of the groove 2a in the magneto optical recording medium 1 according to the first embodiment of the present invention (the raised portion in FIG. 5 corresponds to the groove 2a).

Figure 6:
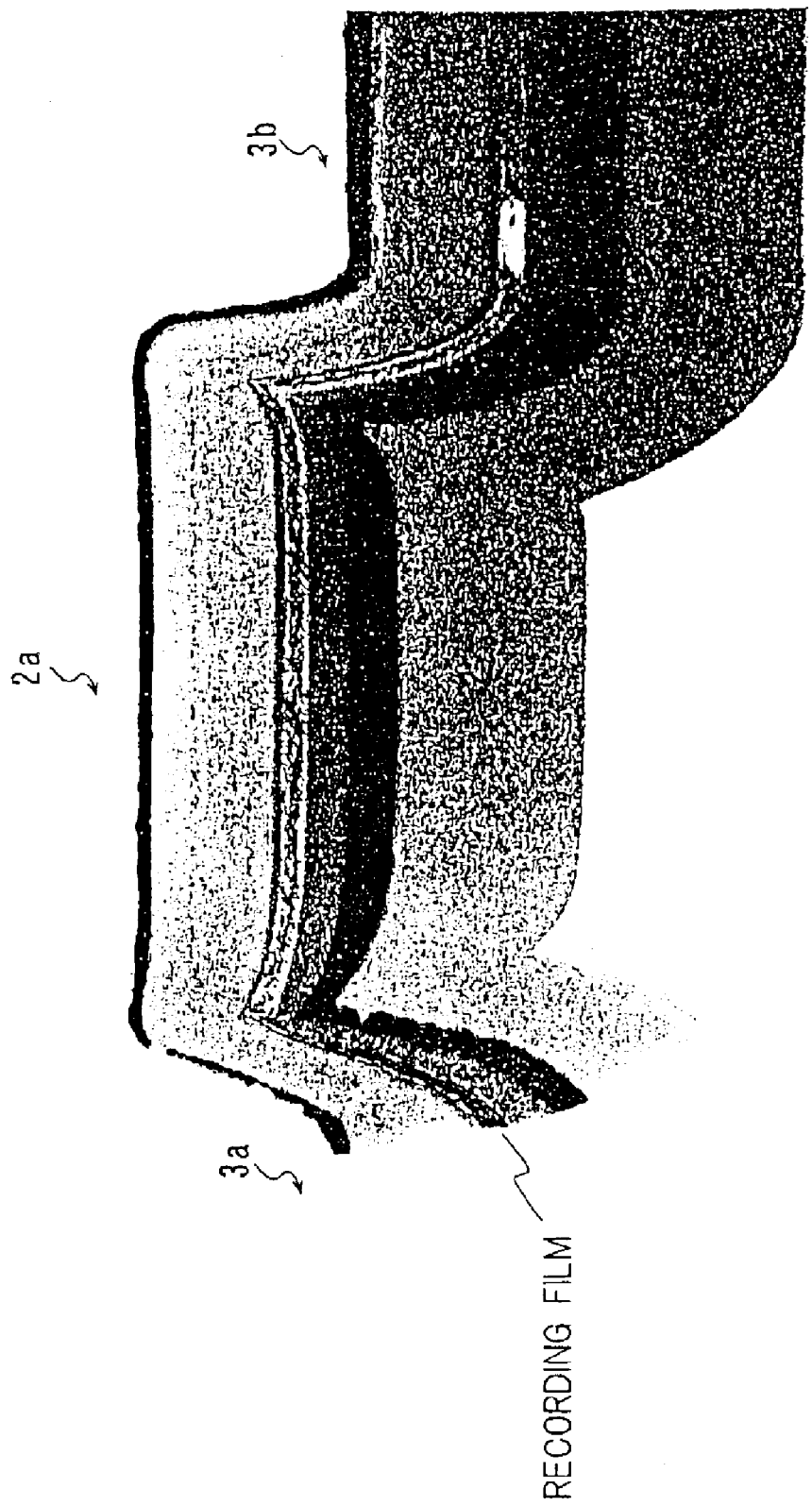
FIG. 6 is a TEM photograph showing a cross section of the magneto optical recording medium according to the first embodiment of the present invention.

FIG. 6 is a transmission electron microscope (TEM) photograph showing a cross section of the magneto, optical recording medium 1 (the raised portion in FIG. 6 corresponds to the groove 2a).

As shown in FIG. 5, the film thickness is increased in the center of the groove 2a, and reduced at the boundaries between the groove 2a and the lands 3a and 3b.

Further, as shown in FIG. 6, the thickness at the boundaries between the groove 2a and the lands 3a and 3b (the areas near the junctions between the groove portions sloping toward the lands and the planar portions of the lands) is smaller than the result of the simulation (FIG. 5), thus providing a sufficient magnetic isolation between the groove 2a and its adjacent groove 2b, etc.

In the present embodiment, the optical disk substrate is placed at a position directly above one target, and a recording film is formed by depositing it on the monoatomic scale or with the monoatomic thickness while rotating the optical disk substrate on its axis (the center of the optical disk substrate is held fixed in position). Next, the optical disk substrate is placed at a position directly above another target, and a recording film is formed by depositing it on the monoatomic scale or with the monoatomic thickness while rotating the optical disk substrate on its axis in like manner. This process is repeated for each target which forms each layer. In this way, the recording film of the structure having an increased thickness at the groove center and reduced thickness at the groove-land boundary, such as shown in FIG. 5, can be fabricated.

As a result, the grooves 2a and 2b of the magneto optical recording medium 1 of the present embodiment can be used, without applying annealing, as recording areas that can be read out by the DWDD method.

The mutually adjacent grooves 2a and 2b are magnetically isolated from each other at least along a portion of the boundary areas (lands 3a and 3b).

Since the magnetic domain wall of the magnetic domain copied from the recording layer 15 to the readout layer 13 can be displaced in a stable manner, expanding the copied domain in the readout layer 13, a signal of small mark length recorded on the magneto optical recording medium can be read out as a signal having an amplitude greater than a certain level.

The "mark length" refers to the length of a recorded magnetic domain in the recording layer 15 (the length in the longitudinal direction of the recording track).

Further, in the present embodiment, since the thicknesses of the readout layer 13 and intermediate layer 14 are small, the same effect of magnetic cutoff between adjacent tracks can be achieved with the structure of the present embodiment having the groove depth described, a track pitch of 1.0 μm or less, a groove width of 0.2 μm to 0.8 μm and land areas.

Here, it is desirable that the lands 3 be formed with no magnetic films adhering to their walls, but if the film thickness is sufficiently reduced in the land/groove boundary areas as shown in the TEM cross section photograph of the magneto optical recording medium in FIG. 6, a readout characteristic equivalent to that described above can be obtained.

Figure 7:
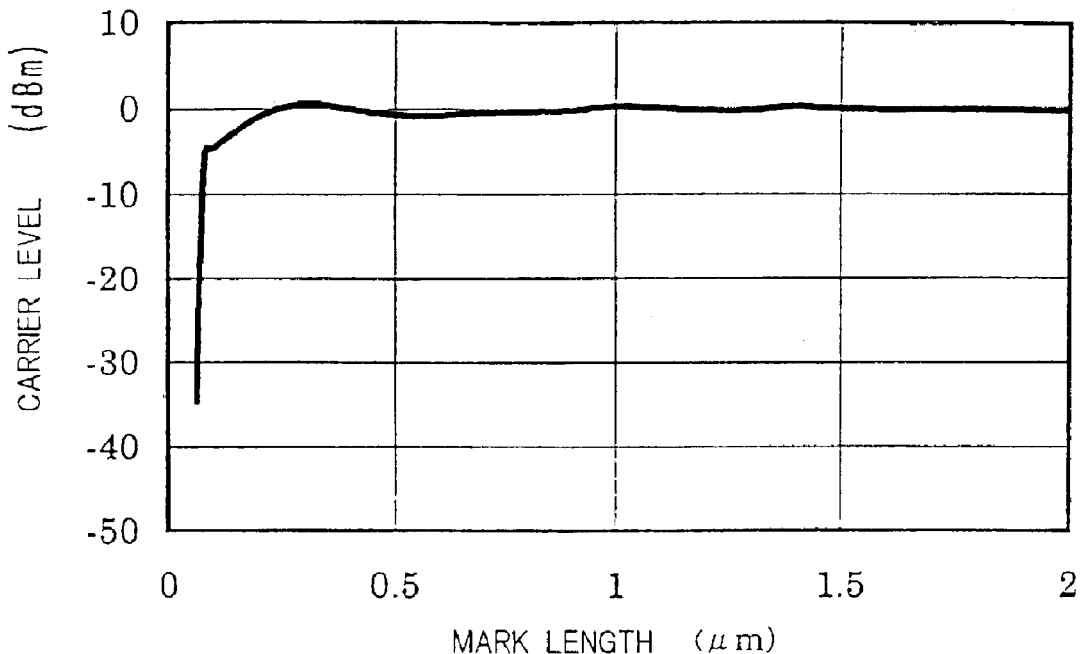
FIG. 7 is a characteristic diagram showing the dependence of carrier level on mark length for the magneto optical recording medium of the present embodiment.

FIG. 7 shows the dependence of the carrier level on the mark length for the magneto optical recording medium of the present embodiment. As shown, when a signal is read from the magneto optical recording medium of the present embodiment by using the DWDD method, a sufficient signal amplitude can be obtained even from a recorded domain of mark length 0.1 μm.

FIG. 7 also shows that in the magneto optical recording medium of the present embodiment, the magnetization in each groove is isolated from that in its adjacent groove by the land and the wall of each magnetic domain in the readout layer 13 has a high mobility.

In the present invention, laser light with a wavelength of 660 nm is used, and the numerical aperture NA is 0.60. Therefore, with a conventional readout method (a readout method other than the DWDD method), the detection limit would be $\lambda/(2 \cdot NA) = 0.55$ μm to 0.60 μm. This means that the present embodiment can achieve a recording density about six times as high as that achieved with the conventional method along the lengthwise direction.

Figure 8:
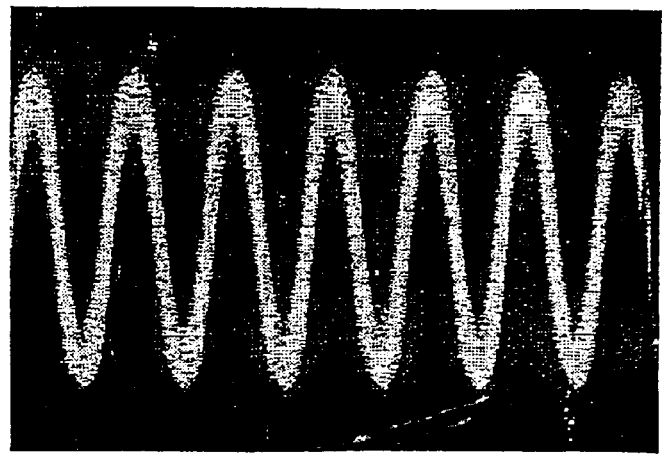
FIG. 8 is a diagram showing readout waveforms for the magneto optical recording medium of the present embodiment for mark lengths of 0.1 $\mu$m, 0.15 $\mu$m, and 0.2 $\mu$m, respectively.
Figure 8:
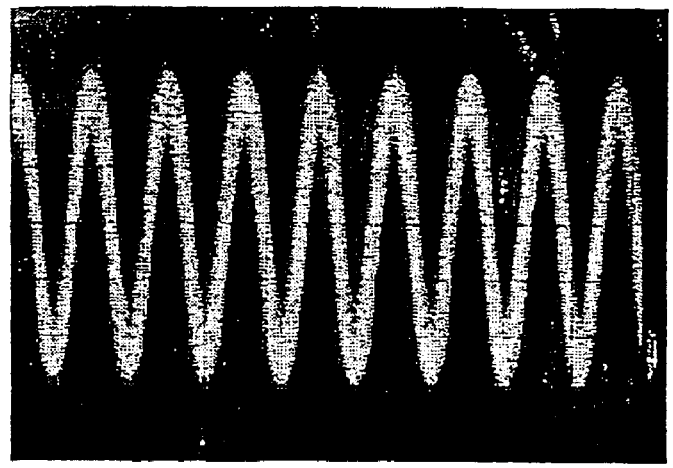
Figure 8:
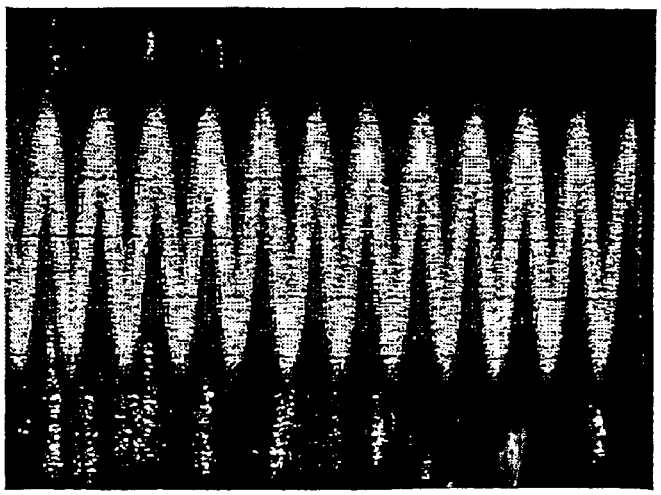

FIG. 8 shows readout waveforms for mark lengths of 0.1 μm, 0.15 μm, and 0.2 μm, respectively. The amplitude of the readout signal almost reaches a saturation level when the mark length is 0.1 μm. This shows that stable magnetic domain wall displacements have occurred in the magneto optical recording medium of the present embodiment, achieving signal readout based on the DWDD method.

Figure 9:
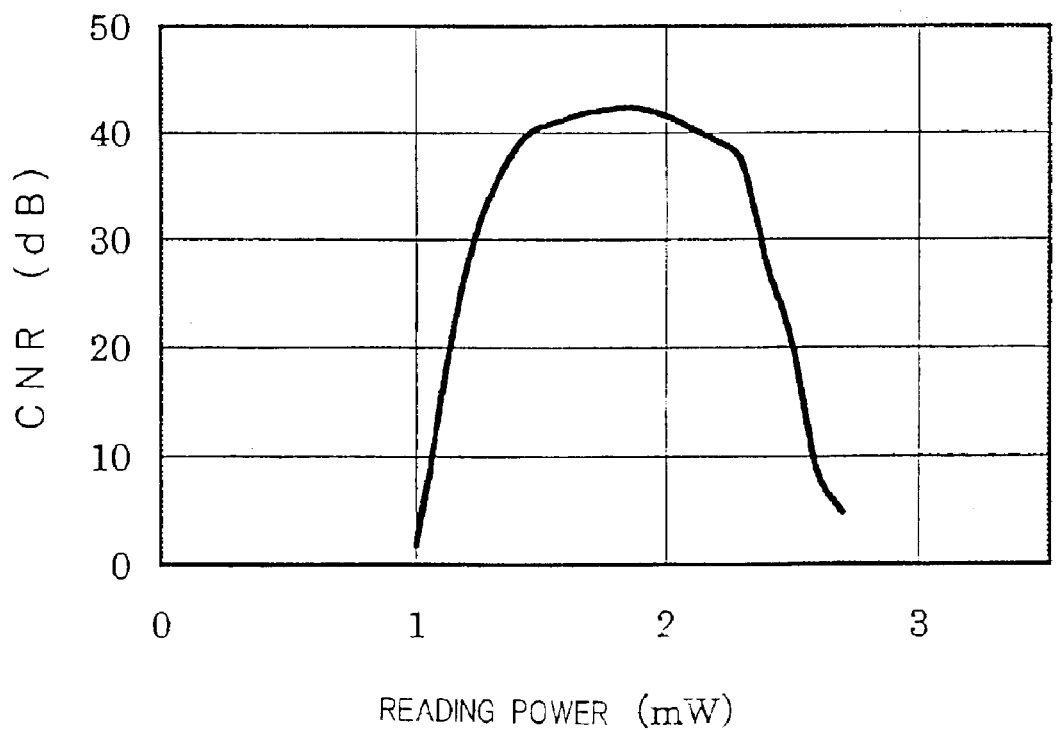
FIG. 9 is a characteristic diagram of the magneto optical recording medium of the present embodiment, showing the dependence of CNR on the reading power for a mark length of 0.15 $\mu$m.

FIG. 9 shows the dependence of the carrier signal to noise ratio (CNR) on the reading power for a mark, length of 0.15 μm. For signal recording, light pulse magnetic modulation recording is used here, and the linear velocity is 1.5 m/s. In this case, as shown in the figure, CNR reaches a maximum when the reading power is 1.8 mW, and it is also seen that a sufficient signal level is obtained even when the reading power varies within a range of ±20%.

When CNR peaks are compared, the CNR of the magneto optical recording medium of the present embodiment shown in FIG. 9 is 1 to 2 dB higher than the CNR of the prior art magneto optical recording medium treated with annealing. The reason for this is believed to be that since annealing is not applied to the magneto optical recording medium of the present invention, the recording film is not subjected to thermal degradation due to annealing.

Furthermore, it has been shown that with the magneto optical recording medium of the present invention, a good readout result can be obtained even at a linear velocity of 5 m/s.

For example, when a signal of a single frequency of 10 MHz is recorded at a linear velocity of 2 m/s, a wavelength of this signal corresponds to a mark length of 0.1 μm.

Figure 10:
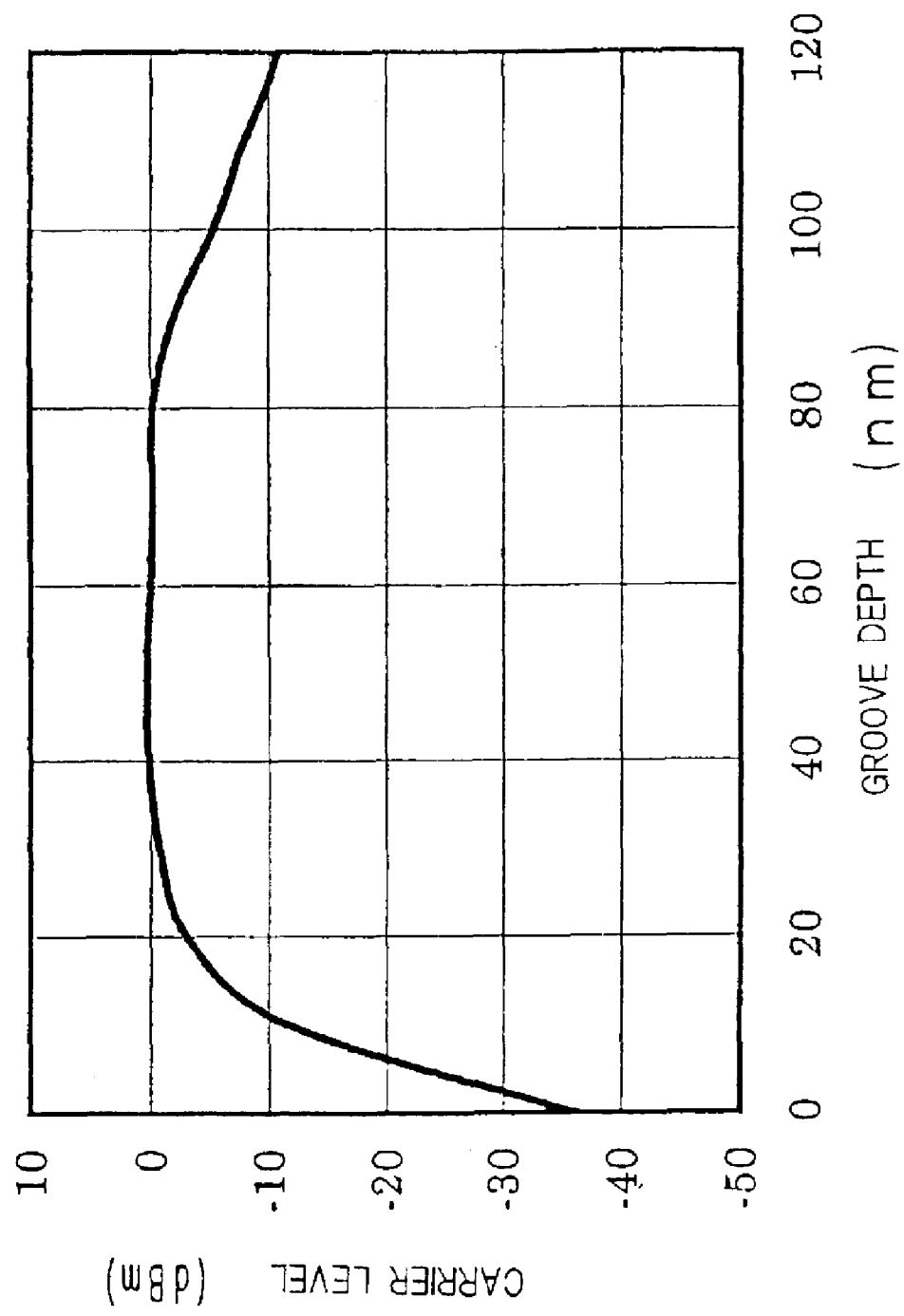
FIG. 10 is a characteristic diagram of the magneto optical recording medium of the present embodiment, showing the dependence of the carrier level on the groove depth for a mark length of 0.15 $\mu$m.

FIG. 10 shows the dependence of the carrier level on the groove depth for a mark length of 0.15 μm. In FIG. 10, the track pitch and the groove width are fixed to 0.8 μm and 0.6 μm, respectively, and only the groove depth is varied.

As can be seen, readout by the DWDD method is possible when the groove depth is 20 nm or larger. On the other hand, when the groove depth exceeds 80 nm, the signal level decreases due to such effects as variations in reflected light amount, increases in groove noise, etc. as in the case of the prior art magneto optical recording medium having a deep groove structure. This shows that to enhance the signal characteristics of the magneto optical recording medium using the DWDD method, the land height as measured from the groove surface is preferably set within a range of 20 nm to 80 nm, and more preferably the groove depth is made not smaller than 40 nm but not larger than 80 nm if the same effect as described above is to be achieved. Moreover, with the above groove depth, in the case of an optical head with a small focused spot diameter, diffracted light from the groove can be used for such purposes as tracking servo.

Figure 11:
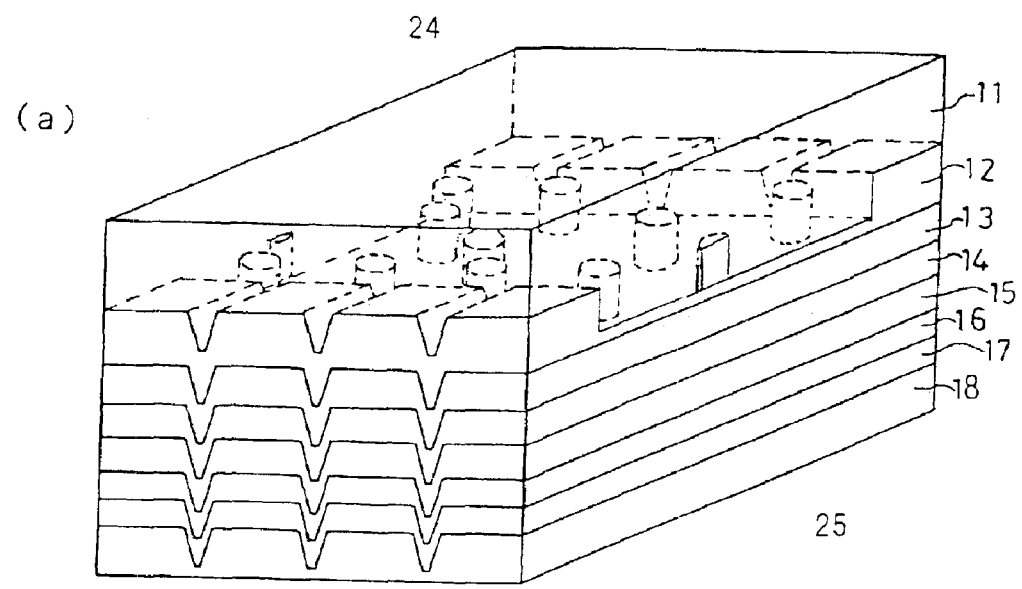
FIG. 11 is a diagram showing the format structure of the magneto optical recording medium of the present invention: part (a) is a cross sectional structural view, and part (b) is a plan structural view.
Figure 11:
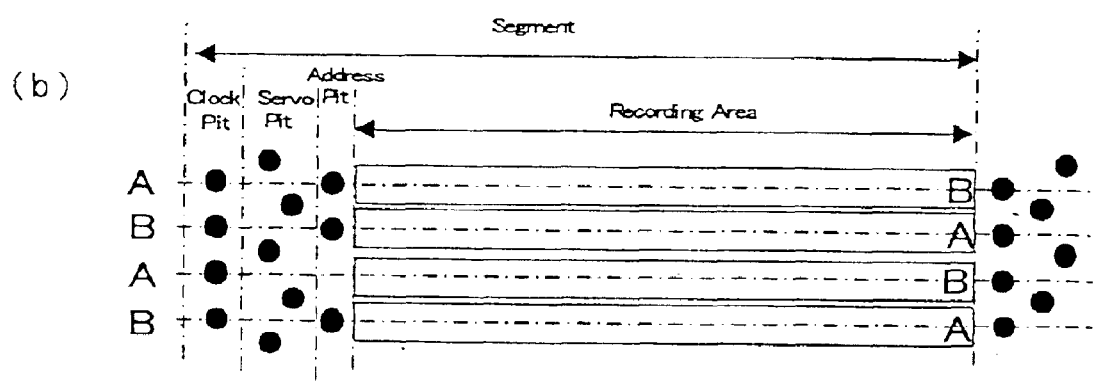
Figure 11:
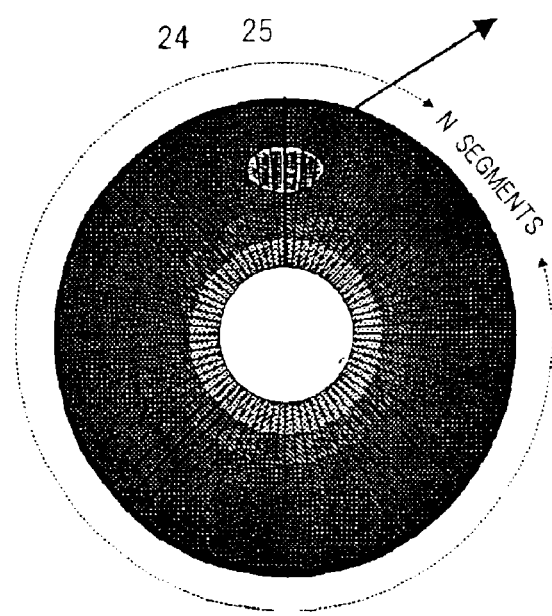

FIG. 11 shows one example of a recording format using the magneto optical recording medium of the present invention.

The present embodiment employs a format structure in which a rewritable groove area and a pre-pit area containing address pits, etc. are arranged alternately with each other on a track, as shown in FIG. 11.

This achieves a magneto optical recording medium of the structure that allows an address to be detected and information to be recorded on or read from the rewritable groove area while applying tracking servo using a sample servo or like method.

Furthermore, with the structure having grooves and pre-pits formed to a depth of 20 nm to 80 nm (or in the range of $\lambda/(20n)$ to $\lambda/(5n)$ where $\lambda$ is the laser light wavelength), pre-pit signals such as address pits can be detected, and DWDD readout can be achieved by magnetically isolating adjacent tracks from each other.

In the present embodiment, the wavelength of the laser light is 660 nm. The refractive index, n, of the optical disk substrate is 1.58 for polycarbonate, 1.52 to 1.53 for polyolefin, 1.52 for glass, and 1.49 for PMMA.

Therefore, when the laser light wavelength is $\lambda = 660$ nm, the grooves and pre-pits are formed to a depth of $\lambda/(20n) = 20$ nm to $\lambda/(5n) = 84$ nm in the case of a polycarbonate optical disk substrate, $\lambda/(20n) = 21$ nm to $\lambda/(5n) = 87$ nm in the case of a polyolefin or glass optical disk substrate, and $\lambda/(20n)=$ 22 nm to $\lambda/(5n)=89$ nm in the case of a PMMA optical disk substrate.

On the other hand, when a violet laser or the like is used, then $\lambda=405$ nm, in which case the grooves and pre-pits are formed to a depth of 13 nm to 85 nm.

Therefore, when the laser light wavelength is $\lambda=405$ nm, the grooves and pre-pits are formed to a depth of $\lambda/(20n)=13$ nm to $\lambda/(3n)=85$ nm in the case of a polycarbonate optical disk substrate, $\lambda/(20n)=13$ nm to $\lambda/(3n)=89$ nm in the case of a polyolefin or glass optical disk substrate, and $\lambda/(20n)=13$ nm to $\lambda/(3n)=91$ nm in the case of a PMMA optical disk substrate.

As described above, according to the structure of the present embodiment, a stable readout signal characteristic can be obtained using the DWDD method even when high density recorded signals are read out.

When information is recorded on the groove of the present embodiment, the value of the groove width influences the readout characteristic in the DWDD method (the characteristic similar to that shown in FIG. 14 for the second embodiment described hereinafter).

The influence that the groove depth measured from the top of the land has on the readout characteristic in the DWDD method exhibits a characteristic similar to that shown in FIG. 10, provided that the magneto optical recording medium 1 has a track pitch in the range of 0.4 µm to 1.0 µm, a groove width in the range of 0.2 µm to 0.8 µm, and a groove depth in the range of 20 nm to 80 nm.

As described above, the magneto optical recording medium of the present invention has a magnetic film that allows readout by the DWDD method, and includes a recording track area that allows alteration of recorded information and a boundary area which is provided between adjacent track areas and in which at least a portion of the film is reduced in thickness. Accordingly, the magneto optical recording medium of the present invention, with its ability to achieve a high magnetic domain wall mobility for copied magnetic domains in the readout layer, allows the use of the DWDD method for signal readout without applying annealing to the boundary area between the recording track areas.

Further, in order to achieve the formation of a thin film area in the boundary area provided between the adjacent recording track areas in the readout layer, grooves and lands are formed on the magneto optical recording medium. Each groove having a shallow groove depth is used as the recording track area for recording information, and each land provided between adjacent grooves is used as the boundary area having such purposes as providing a magnetic isolation. When the groove depth measured from the top of the land is set as small as $\lambda/(20n)$ to $\lambda/(3n)$ as earlier described, not only can the optical disk substrate be molded easily, but noise from the groove can also be reduced, and furthermore, cross write and cross talk at the time of information recording/reading can be prevented.

Embodiment 2

Next, the structure of the magneto optical recording medium according to the second embodiment of the present invention will be described in detail below with reference to FIG. 12.

Figure 12:
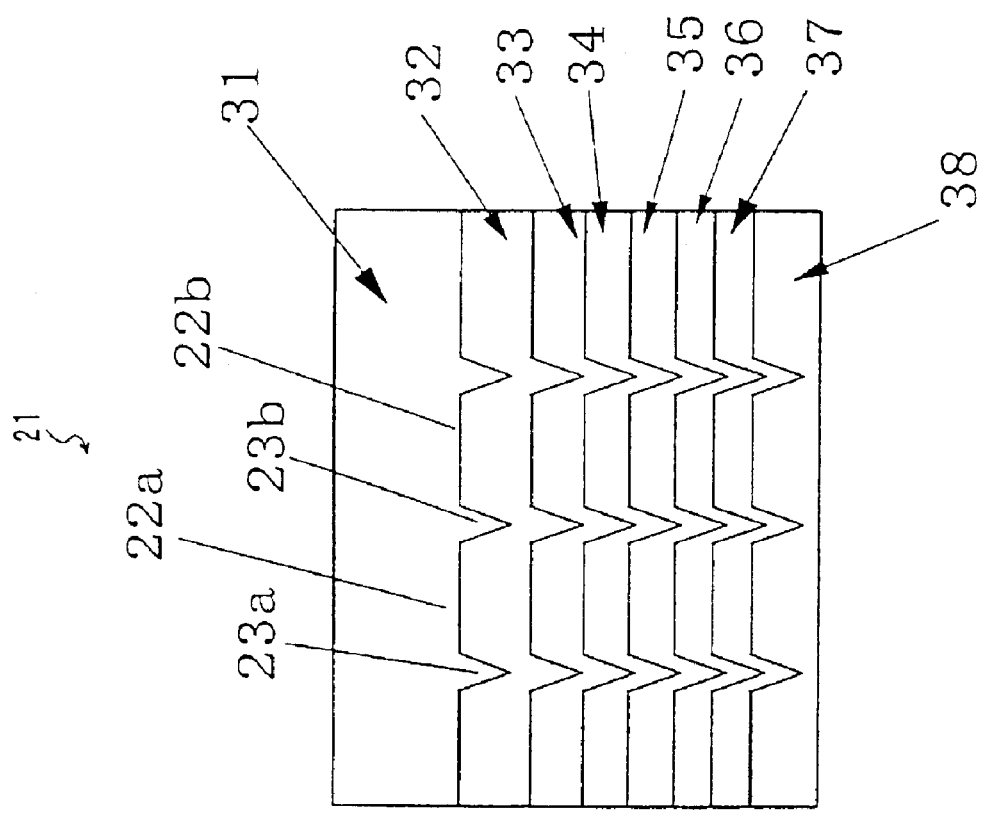
FIG. 12 is a cross sectional view showing the structure of a magneto optical recording medium according to a second embodiment of the present invention.

FIG. 12 is a cross sectional view showing the structure of the magneto optical recording medium (magneto optical disk) 21 according to the second embodiment of the present invention. FIG. 12, similarly to FIG. 1, shows the cross section of the disk-shaped magneto optical disk cut along the radial direction thereof. Groove-shaped recording track areas extend, one adjacent to the other, in a direction perpendicular to the plane of FIG. 12.

In the figure, reference numeral 31 is an optical disk substrate made of polycarbonate, and grooves 22a and 22b, one adjacent to the other in the widthwise direction, form the recording track areas. In boundary areas between adjacent recording track areas are formed inverted V-shaped lands 23a and 23b which isolate the adjacent recording track areas from one another.

The present embodiment employs a format structure in which a groove forming a rewritable recording track area and an area containing pre-pits such as wobble pits 24 for servo control, address pits 25, etc. are arranged alternately with each other on a track, as shown in FIG. 11.

Therefore, information can be recorded on or read from the rewritable area by detecting an address while applying tracking servo using a sample servo method.

As shown in FIG. 12, the magneto optical recording medium 21 of the present embodiment comprises a transparent disk substrate 31 of polycarbonate formed with grooves and lands and pre-pits such as address pits, a dielectric layer 32 for protecting a recording film and for adjusting the optical properties of the medium, the recording film comprising multiple layers 33, 34, 35, and 36, a dielectric layer 37 for protecting the recording film, and an overcoat layer 38 formed on top of it.

The multilayer recording film consists of four layers, that is, a readout layer 33 for detecting information from a magnetic domain expanded by wall displacement, a control layer 34 for reducing ghosts, an intermediate layer 35 for controlling the exchange coupling between the readout layer and recording layer, and the recording layer 36 for holding recorded information therein.

Using the magneto optical recording medium of the second embodiment of the invention shown in FIG. 12, super resolution readout exceeding the detection limit determined by the wavelength of the reading light and the numerical aperture of the objective lens can be achieved by using the DWDD readout method which sequentially displaces the magnetic domain wall coming into the spot of the reading light beam and detects the copied magnetic domain formed in the readout layer and expanded by the magnetic domain wall displacement.

The magneto optical disk 21 of the present embodiment comprises a multilayer film, containing magnetic layers, formed on the optical disk substrate 31. The lands 23a and 23b are formed along the boundaries of the groove 22a; the depth, h, of the groove 22a is 60 nm measured from the top of the lands 23a and 23b. With the provision of the land 23b, the grooves 22a and 22b are magnetically independent of each other. The track pitch of the magneto optical recording medium (magneto optical disk) 21 of this embodiment is 0.6 µm, and the groove width is 0.45 µm.

A method of manufacturing the magneto optical recording medium 21 shown in FIG. 12 will be described.

First, the transparent optical disk substrate 31 of polycarbonate formed with the grooves and lands and the pre-pits such as address pits is molded.

Next, a B-doped Si target is placed in a DC magnetron sputtering chamber and, after fixing the optical disk substrate 31 to a substrate holder, the chamber is evacuated and exhausted by a cryopump until the pressure is brought down to $1\times10^{-5}$ Pa or less. With the chamber kept evacuated and exhausted, Ar gas and $N_2$ gas are introduced into the chamber until the pressure rises to 0.3 Pa, and while rotating the substrate, an SiN layer as the dielectric layer 32 is formed to a thickness of 70 nm by reactive sputtering.

Next, with the chamber-kept evacuated and exhausted as described above, Ar gas is introduced into the chamber until the pressure rises to 0.4 Pa, and while rotating the substrate, the following layers are formed one on top of another by DC magnetron sputtering: first, the readout layer 33 of GdFe-CoAlTi is formed to a thickness of 40 nm on the dielectric layer 32 by using Gd, Fe, Co, Al, and Ti targets, then the control layer 34 of TbFe is formed to a thickness of 10 nm by using Tb and Fe targets, then the intermediate layer 35 of TbDyFeAlTi is formed to a thickness of 10 nm by using Tb, Dy, Fe, Al, and Ti targets, and finally the recording layer 36 of TbFeCo is formed to a thickness of 50 nm by using Tb, Fe, and Co targets.

Here, the film composition of each layer can be adjusted to the desired composition by adjusting the charging power ratio of the respective targets.

Next, a B-doped Si target is mounted, and Ar gas and $N_2$ gas are introduced into the chamber until the pressure rises to 0.3 Pa, and while rotating the substrate, the second dielectric layer 37 of SiN is formed to a thickness of 70 nm by reactive sputtering.

Next, after applying an epoxy acrylate based resin on the dielectric layer 37, the overcoat layer 38 is formed by spin coating; the overcoat layer 38 is cured by irradiating it with a UV lamp.

Here, the GdFeCoAlTi readout layer 33 is formed by progressively varying the composition in the thickness direction by varying the charging power ratio of the respective targets. The readout layer 33 is constructed to have a Curie temperature changing from 260° C. to 160° C. and a compensation composition temperature changing from 230° C. to 130° C., both the Curie temperature and the compensation composition temperature being the highest at the dielectric layer 32 side and the lowest at the control layer 34 side.

The composition containing Al and Ti serves to increase the mobility. Further, the temperature gradient provided in the readout layer serves to stabilize the domain expansion action in the readout layer.

The TbFe control layer 34 has a Curie temperature of 155° C., and the TbDyFeAlTi intermediate layer 35 has a Curie temperature of 140° C.; below the Curie temperature, the transition metal composition is always dominant in either layer.

The TbFeCo recording layer 36 is constructed to have a compensation composition temperature of 20° C. and a Curie temperature of 300° C. by adjusting its composition.

The multilayer film containing the magnetic layers described above is formed on the disk substrate 31. The lands 23a and 23b shaped in an inverted V are formed between the grooves 22a and 22b; the depth, h, of the groove 22 is 60 nm measured from the top surface of the land 23.

With the provision of the lands 23a and 23b, the grooves 22a and 22b are magnetically independent of each other.

The track pitch of the magneto optical disk 21 of this embodiment is 0.6 μm, and the groove width is 0.45 μm.

The land areas 23a and 23b having the inverted V-shaped structure can cut off the magnetic coupling between the adjacent recording/readout areas, i.e., the grooves 22a and 22b, even when the width of the land area is small. This structure contributes to increasing the density of the magneto optical recording medium, since the track pitch (groove width+track width) can be reduced for the same recording track width (groove width).

Figure 13:
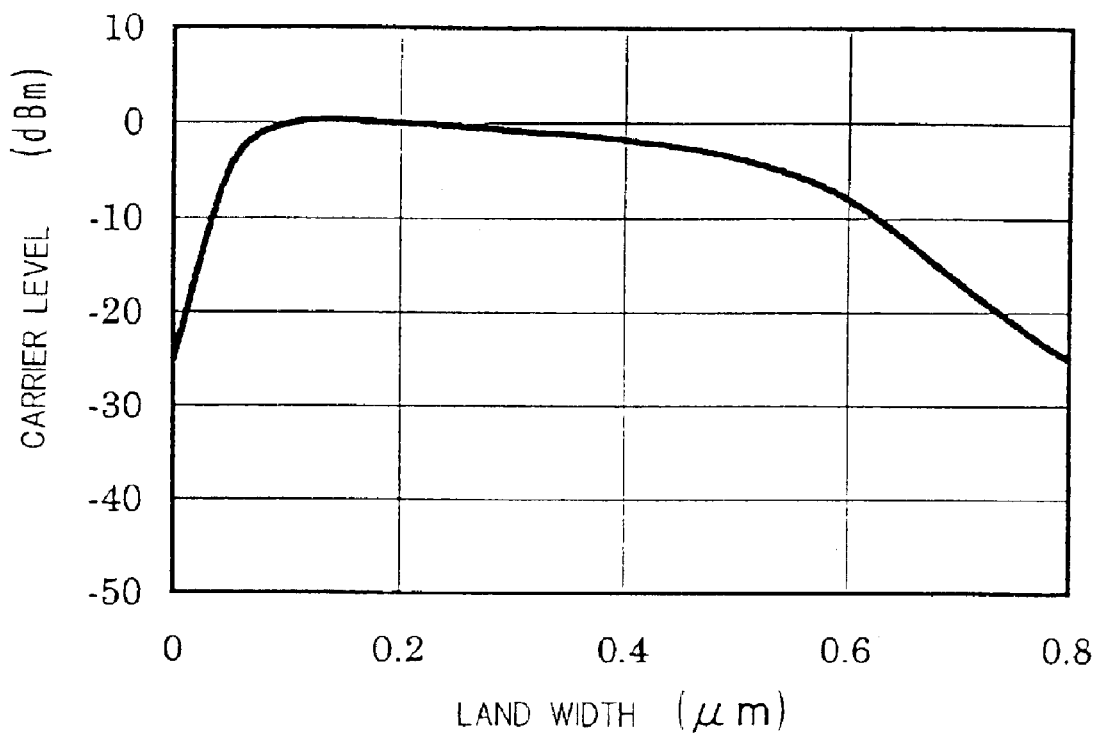
FIG. 13 is a characteristic diagram of the magneto optical recording medium according to the second embodiment of the present invention, showing the dependence of the carrier level on the land width for a mark length of 0.15 $\mu$m.

FIG. 13 shows the dependence of the carrier level (readout signal level) on the land width when a signal with a mark length of 0.15 μm is recorded. FIG. 13 is a diagram showing the characteristic when the track pitch is 0.9 μm and the land height relative to the groove is 60 nm; as can be seen, when the land width is 0.05 μm or larger, the effect of cutting off the magnetic characteristic between adjacent grooves can be obtained.

More preferably, the land width is set to 0.1 μm or larger, considering the injection molding of the disk substrate.

If the land width is 0.4 μm or larger, the carrier level drops since the groove width is reduced. In particular, when the track pitch is reduced, since the carrier level drops greatly, it is preferable to set the land width not larger than 0.3 μm to secure the carrier level by the enough groove width.

Figure 14:
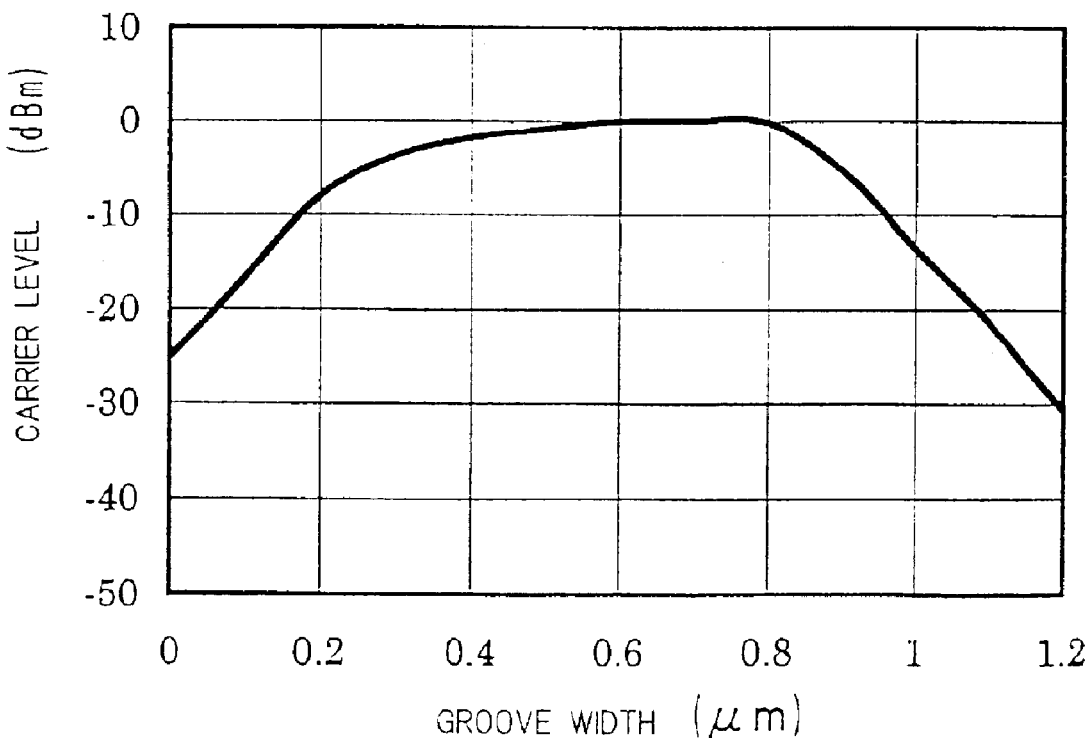
FIG. 14 is a characteristic diagram of the magneto optical recording medium according to the second embodiment of the present invention, showing the dependence of the carrier level on the groove width for a mark length of 0.15 μm.

FIG. 14 shows the dependence of the carrier level on the groove width when a signal with a mark length of 0.15 μm is recorded. FIG. 14 is a diagram showing the characteristic when the track pitch is 1.5 μm and the land height relative to the groove its 60 nm; as shown, when the groove width is smaller than 0.2 μm, the carrier level drops sharply since the signal level from the groove decreases.

Further, when the land height is 60 nm, if the groove width is larger than 0.8 μm, the change in the film thickness in the groove-land boundary becomes small, and the effect of cutting off the magnetic characteristic between adjacent grooves drops, resulting in a decrease in the carrier level when the signal is read using the DWDD method. In view of this, the magneto optical recording medium of the present invention has a groove width not smaller than 0.2 μm but not larger than 0.8 μm. More preferably, to ensure the carrier level when information is recorded at a higher density, the magneto optical recording medium has a groove width not smaller than 0.35 μm but not larger than 0.8 μm.

As described above, the magneto optical recording medium of the present invention has a magnetic film that allows readout by the DWDD method without applying annealing, and includes a recording track area that allows alteration of recorded information and a boundary area that is provided between adjacent recording track areas and in which at least a portion of the film is reduced in thickness.

More specifically, the magneto optical recording medium of the present invention has a track spacing of 1.0 μm or less, a land width not smaller than 0.05 μm but not larger than 0.3 μm, and a groove width not smaller than 0.2 μm but not larger than 0.8 μm; this structure ensures a high magnetic domain wall mobility for copied magnetic domains in the readout layer at the time of readout by the DWDD method, without applying annealing to the areas between recording track areas. As a result, a readout signal of a sufficient level can be obtained from a copied magnetic domain expanded by magnetic domain wall displacement even when the mark length is 0.2 μm or smaller.

Furthermore, in the present embodiment, by adding at least either Al or Ti, the magnetic domain wall coercivity is reduced and, with stable magnetic domain wall displacement, signal readout with good signal characteristics becomes possible using the DWDD method (a readout signal of a stable and readable level is obtained even for a signal of a short mark length).

Embodiment 3

Next, the structure of the magneto optical recording medium according to a third embodiment of the present invention will be described in detail below with reference to drawing.

Figure 15:
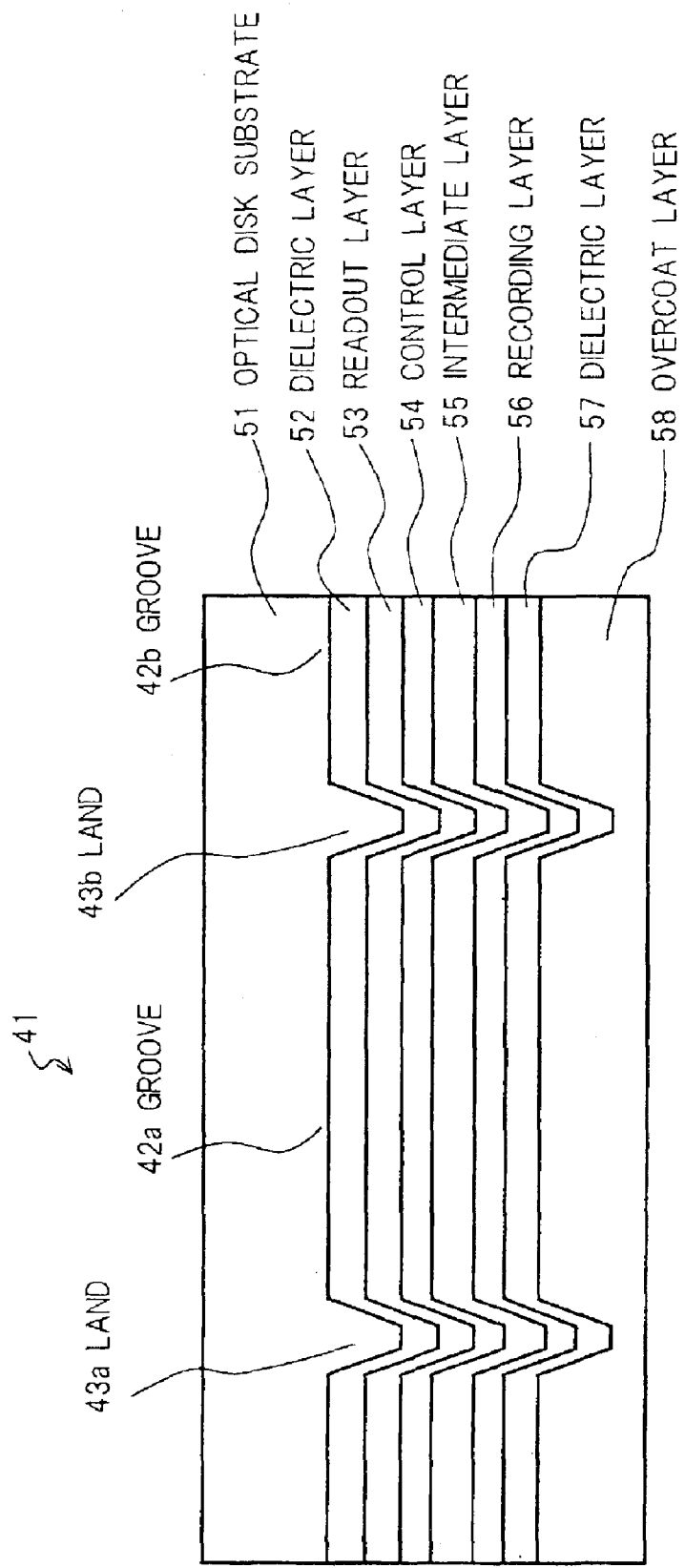
FIG. 15 is a cross sectional view showing the structure of a magneto optical recording medium according to a third embodiment of the present invention.

FIG. 15 is a cross sectional view showing the structure of the magneto optical recording medium (magneto optical disk) 41 according to the third embodiment of the present invention. FIG. 15 shows the cross section of the disk-shaped magneto optical disk cut along the radial direction thereof. Grooves 42a and 42b forming recording track areas extend, one adjacent to the other, in a direction perpendicular to the plane of FIG. 15.

Reference numeral 51 is a polycarbonate optical disk substrate formed with the grooves and lands and pre-pits such as address pits. The grooves 42a and 42b, one adjacent to the other in the widthwise direction, form the recording track areas. The lands 43a and 43b formed in the shape of a rectangle or trapezoid in boundary areas between adjacent grooves magnetically isolate the adjacent recording track areas from each other.

The magneto optical recording medium 41 of the present embodiment, like the magneto optical recording medium of the second embodiment, comprises a transparent optical disk substrate 51 of polycarbonate formed with the grooves and lands and the pre-pits such as address pits, on which are formed one on top of another a dielectric layer 52 for protecting a recording film and for adjusting the optical properties of the medium, the recording film comprising multiple layers 53, 54, 55, and 56, a dielectric layer 57 for protecting the recording film, and an overcoat layer 58.

The recording film of multiple layers 53, 54, 55, and 56 consists of a readout layer 53 for detecting information from a copied magnetic domain expanded by wall displacement, a control layer 54 for reducing a ghost signal, an intermediate layer 55 for controlling the exchange coupling between the readout layer and recording layer, and the recording layer 56 for holding recorded information therein.

The magneto optical recording medium of the third embodiment of the invention shown here, like the magneto optical recording medium of the first embodiment, is applicable to a magneto optical recording medium that allows super resolution readout exceeding the detection limit determined by the wavelength of the reading light and the numerical aperture of the objective lens, the super resolution readout being achieved by sequentially displacing the magnetic domain wall coming into the spot of the reading light beam and detecting a readout signal from the magnetic domain expanded by the magnetic domain wall displacement.

In particular, the readout layer 53 of the present embodiment is formed from three magnetic films of different compositions.

As shown, the magneto optical disk 41 of the present embodiment comprises the multilayer film, containing the magnetic layers, formed on the optical disk substrate 51.

The lands 43a and 43b are formed along the boundaries of the groove 42a; the depth, h, of the groove 42 is 55 nm measured from the top surface of the land 43, and the slope angle of the sloping face of the land is 60 degrees. With the provision of the land, the grooves 42a and 42b are magnetically independent of each other.

The track pitch of the magneto optical disk 41 of this embodiment is 0.8 μm, and the groove width is 0.65 μm.

A method of manufacturing the magneto optical recording medium of the third embodiment will be described below.

First, the transparent optical disk substrate 51 of polycarbonate formed with the grooves and lands and the pre-pits such as address pits is molded.

Next, a B-doped Si target is placed in a DC magnetron sputtering chamber and, after fixing the optical disk substrate 51 to a substrate holder, the chamber is evacuated and exhausted by a cryopump until the pressure is brought down to $1 \times 10^{-5}$ Pa or less. With the chamber kept evacuated and exhausted, Ar gas and $N_2$ gas are introduced into the chamber until the pressure rises to 0.3 Pa, and while rotating the substrate, an SiN layer as the dielectric layer 52 is formed to a thickness of 80 nm by reactive sputtering.

Next, with the chamber kept evacuated and exhausted as described above, Ar gas is introduced into the chamber until the pressure rises to 0.4 Pa, and while rotating the substrate, films of GdFeCoCr forming the readout layer 53 are deposited each to a thickness of 10 nm on the dielectric layer 52 by DC magnetron sputtering using three alloy targets of different composition ratios, Gd25Fe60Co11Cr4, Gd24Fe58Co10Cr8, and Gd23Fe55Co9Cr13 (composition ratios by mol %). (The readout layer 53 is constructed from three layers each having the composition based on the alloy target used.)

Next, the control layer 54 of TbFeCr of thickness 5 nm, the intermediate layer 55 of TbDyFe of thickness 10 nm, and the recording layer 56 of TbFeCoCr of thickness 60 nm are deposited one on top of another by DC magnetron sputtering by using the respective alloy targets.

Figure 18:
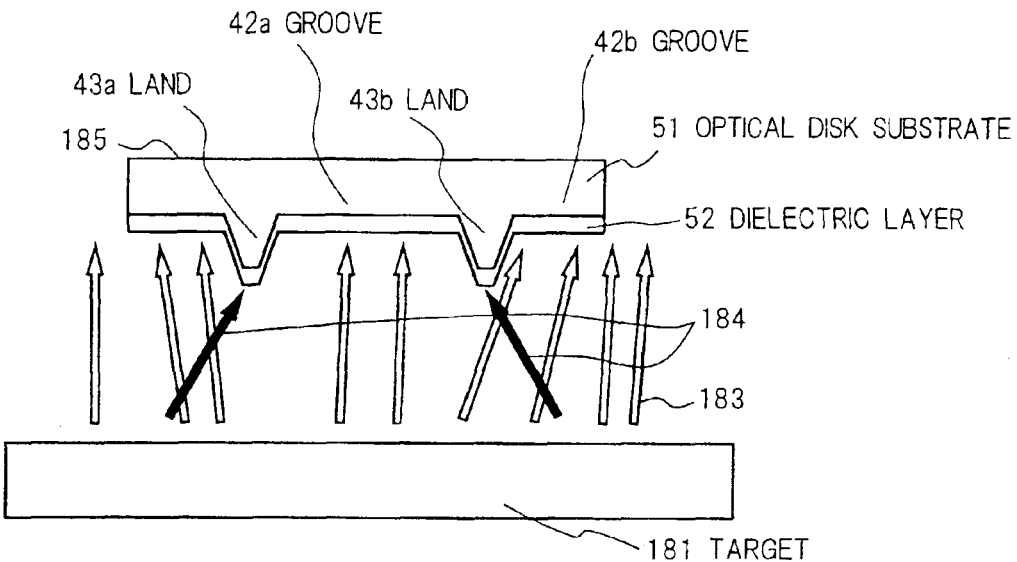
FIG. 18(a) is a diagram schematically showing a sputtering process for an optical disk substrate according to the manufacturing method of the present invention.
FIG. 18(b) is a diagram schematically showing a sputtering process for an optical disk substrate according to a prior art manufacturing method.
Figure 18:
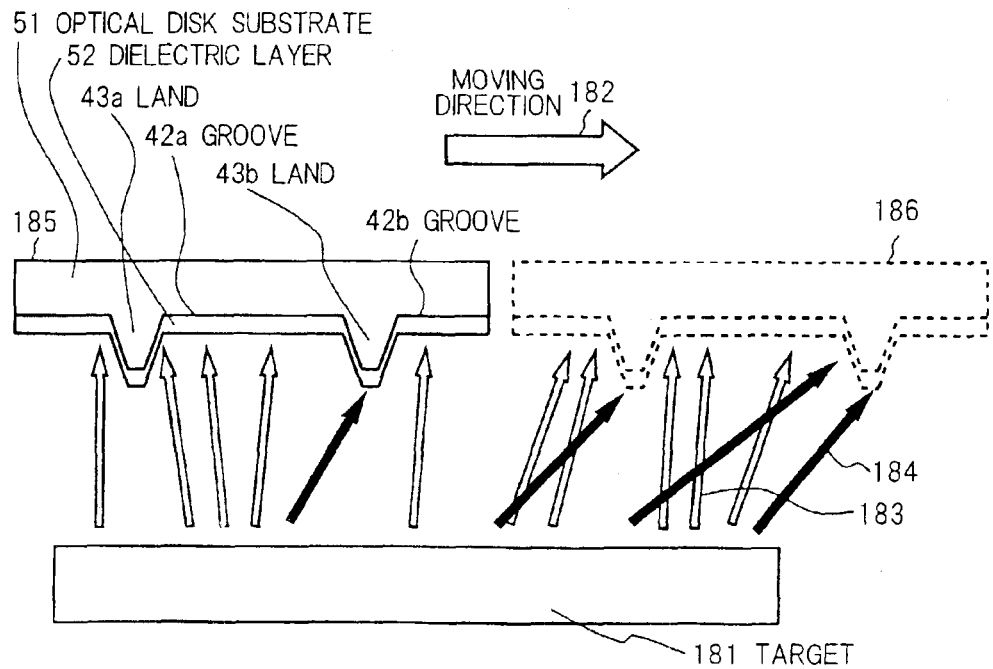

The film deposition method for forming the recording film by sputtering on the magneto optical recording medium of the present embodiment will be described below. FIG. 18(a) is a diagram schematically showing the film deposition process performed using the sputtering method according to the present invention. FIG. 18(b) is a diagram schematically showing the film deposition process performed using a prior art sputtering method.

In the prior art sputtering method shown in FIG. 18(b), the optical disk substrate 51 (with the dielectric layer 52 formed thereon) rotating on its axis is moved over an alloy target 181 in direction 182 in a vacuum chamber, and the recording film is formed by sputtering while the optical disk substrate is being moved past the alloy target. As shown, when the optical disk substrate is passing directly above the target (the optical disk substrate 51 is located at position 185), the particles sputtered obliquely as shown by arrow 183 are difficult to deposit on the portion (slope) of the groove that is hidden by the land 43a, 43b (the particles are difficult to adhere to this portion since the sputtering direction of the particles is nearly parallel to the land slope (hidden portion)), but tend to easily deposit on the center portion of the groove (the sputtering direction 183 of the particles is substantially perpendicular to the surface at the center of the groove). This tendency also occurs in the sputtering method of the present invention shown in FIG. 18(a). However, when the optical disk substrate 51 is moved to the position 186 and located obliquely above the target, the particles sputtered in the oblique direction 184 tend to deposit on the inside of the groove, particularly, the portion along the groove-land boundary, or the sloping portion of the land (the sputtering direction 184 of the particles is nearly perpendicular to the land slope, etc.). As a result, with the prior art sputtering method, the film thickness at the center of the groove 42a, 42b on the completed magneto optical recording medium is nearly the same as the film thickness at the groove-land boundary, that is, the recording film is formed uniformly within the groove.

On the other hand, in the sputtering method of the present embodiment shown in FIG. 18(a), the optical disk substrate 51 (with the dielectric layer 52 formed thereon) is placed at position 185 directly opposite and above the alloy target 181 having the composition corresponding to the recording film composition, and the recording film is deposited by sputtering while the optical disk substrate 51 is being rotated on its axis. During sputtering, the center of the optical disk substrate is held stationary. In this film deposition method, while the sputtering angle of particles and their distribution vary depending on the element used as the material, as shown in FIG. 18(a) the particles sputtered in a vertical direction 183 from the target surface tend to adhere, in particular, to the inside of the groove on the optical disk substrate 51 placed directly above the alloy target. On the other hand, the particles sputtered in an oblique direction 184 from the target surface are deposited on the center of the groove, but are difficult to deposit as a film on the groove-land boundary portion hidden by the land. This is because the path of the particles sputtered in the oblique direction is obstructed by the land, and because the sputtering direction of the particles becomes nearly parallel to the land slope (hidden portion), making the particles difficult to adhere as a film.

In the present embodiment, the distance between the target and the optical disk substrate is 40 mm, and as this distance is reduced, the above tendency becomes more pronounced.

If the target is a circle with a diameter of 250 mm or less, or a rectangle at least one side of which is 200 mm or shorter, a similar effect to that achieved by the film deposition method of the embodiment can be obtained when the distance between the target and the optical disk substrate is set within the range of 20 mm to 120 mm.

As described above, according to the film deposition method (FIG. 18(a)) of the embodiment of the invention, a recording film having an increased film thickness at the center of the groove and a reduced film thickness at the groove-land boundary can be formed on the magneto optical recording medium.

When forming the multilayer recording film, alloy targets of different compositions are placed in a plurality of chambers, one target in each chamber, and the recording film layers are successively deposited in the respective chambers by using the sputtering method of FIG. 18(a). This achieves the formation of the multilayer recording film which has an increased film thickness at the center of the groove and a reduced film thickness at the groove-land boundary.

In a sputtering step of a magneto optical recording medium manufacturing method according to an alternative embodiment, instead of the alloy targets a plurality of targets (different targets may be used for different elements) for forming the respective recording film layers are placed inside a vacuum chamber. The optical disk substrate is placed at a position opposite each target and, using the method of FIG. 18(a) (with the center of the optical disk substrate held stationary), each recording film layer is formed on the monoatomic scale or with the monoatomic thickness by magnetron sputtering. When the magnetron sputtering with one target is finished, magnetron sputtering is performed with the next target by using the same method (the method of FIG. 18(a)). This process is repeated. In this way, the recording film layers can be deposited to form the recording film that has an increased film thickness at the center of the groove and a reduced film thickness at the groove-land boundary.

Next, a B-doped Si target is mounted, and Ar gas and $N_2$ gas are introduced into the chamber until the pressure rises to 0.3 Pa, and while rotating the substrate, the second dielectric layer 57 of SiN is formed to a thickness of 80 nm by reactive sputtering.

Next, after applying an epoxy acrylate based resin on the dielectric layer 57, the overcoat layer 58 is formed by spin coating; the overcoat layer 58 is cured by irradiating it with a UV lamp.

Here, the GdFeCoCr readout layer 53 is constructed from three layers of different compositions, i.e., a layer having a compensation composition temperature of 160° C. and a Curie temperature of 230° C., a layer having a compensation composition temperature of 140° C. and a Curie temperature of 200° C., and a layer having a compensation composition temperature of 120° C. and a Curie temperature of 170° C.

The TbFeCr control layer 54 has a Curie temperature of 130° C. and, below the Curie temperature, the transition metal composition is always dominant.

The TbDyFe intermediate layer 55 has a Curie temperature of 120° C. and, below the Curie temperature, the transition metal composition is always dominant.

On the other hand, the TbFeCoCr recording layer 56 is constructed to have a compensation composition temperature of 100° C. and a Curie temperature of 260° C. by adjusting its composition.

As shown, the multilayer recording film, containing the magnetic films, is formed on the optical disk substrate 51, and the optical disk substrate 51 includes the grooves 42a and 42b between which is formed the land 43a, 43b of a rectangular or trapezoidal shape.

The depth, h, of the grooves 42a and 42b is 70 nm measured from the upper surface of the lands 43a and 43b.

The grooves 42a and 42b are separated by the lands 43a and 43b and magnetically independent of each other.

The magneto optical disk 41 of the present embodiment has a track pitch of 0.8 $\mu$m and a groove width of 0.65 $\mu$m.

The rectangular lands 43a and 43b have sloping faces sloping at an angle of 60 degrees (the angle relative to the planar portion of the groove); because of these sloping faces, the magnetic coupling between the adjacent grooves 42, i.e., the recording/readout areas, can be reliably cut off.

The same effect can be obtained as long as the slope angle of the sloping face of the rectangular or trapezoidal land formed between the grooves is set within the range of 40 to 70 degrees.

As described above, the magneto optical recording medium of the present embodiment comprises a magnetic film that allows readout by the DWDD method, and a rectangular or trapezoidal land formed between adjacent grooves and having a sloping face with a slope angle of 40 to 70 degrees.

Further, the magneto optical recording medium of the present embodiment has a structure such that at least a portion of the film formed in the boundary area between mutually adjacent information-rewritable recording track areas is reduced in thickness.

This structure ensures a high magnetic domain wall mobility for copied magnetic domains in the readout layer at the time of readout by the DWDD method, without having to apply annealing, and a signal can be read out from a copied magnetic domain expanded by magnetic domain wall displacement even when the mark length is 0.2 $\mu$m or smaller (the effect is comparable or superior to that achieved in the first embodiment).

When the slope angle of the sloping faces of the rectangular or trapezoidal lands formed between the grooves on the optical disk substrate is set within the range of 40 to 70 degrees, a magneto optical recording medium can be achieved that has good signal characteristics, and that facilitates optical disk mastering (cutting of a master optical disk) when producing stampers, and also facilitates the production of stampers and the fabrication of optical disk substrates.

When the readout layer is formed using a single alloy target, the thickness of a portion of the recording film on the land slope is thinner than when the readout layer is formed using a plurality of targets. As a result, the magnetic coupling between adjacent recording tracks can be cut off more effectively.

Further, since the readout layer is formed from a stack of three layers of different compositions, a magnetic domain is smoothly expanded as it is copied into the readout layer. Accordingly, the readout layer of the third embodiment has a higher magnetic domain wall mobility than the readout layer of a single composition.

Embodiment 4

Next, the structure of the magneto optical recording medium according to a fourth embodiment of the present invention will be described in detail below with reference to drawing.

Figure 16:
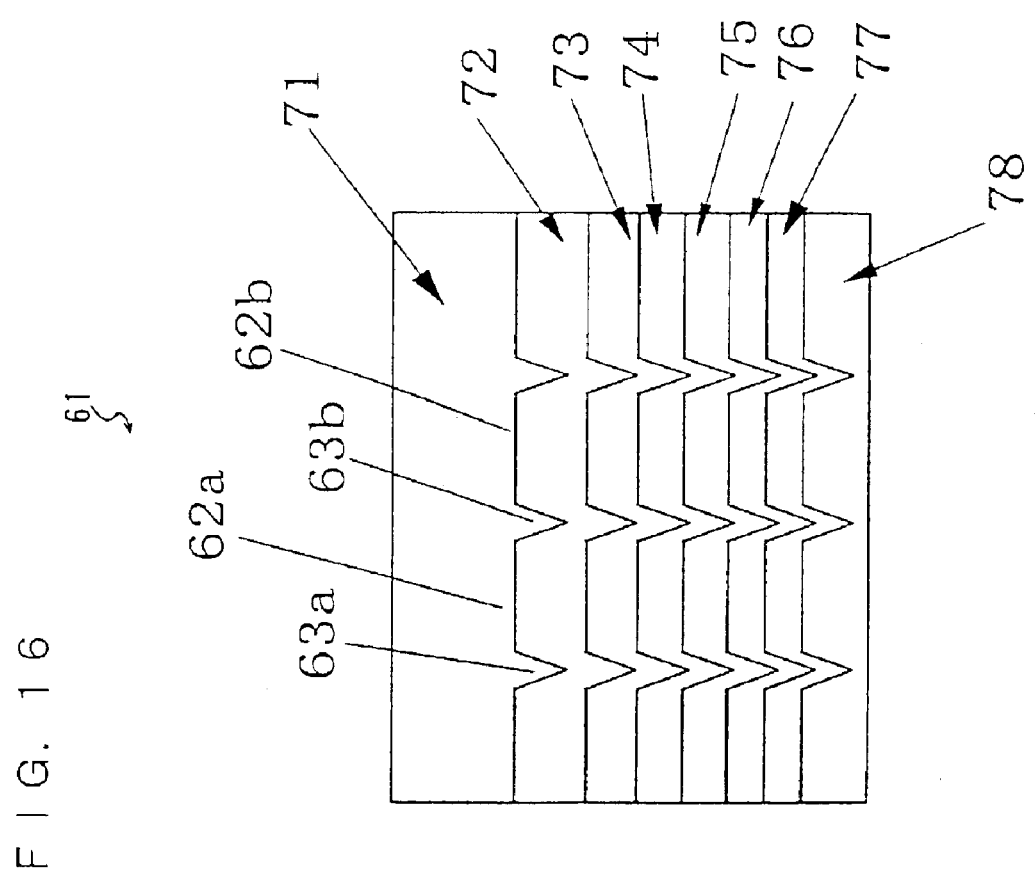
FIG. 16 is a cross sectional view showing the structure of a magneto optical recording medium according to a fourth embodiment of the present invention.

FIG. 16 is a cross sectional view showing the structure of the magneto optical recording medium (magneto optical disk) according to the fourth embodiment of the present invention. FIG. 16 shows the cross section of the disk-shaped magneto optical disk cut along the radial direction thereof. Grooves 62a and 62b forming recording track areas extend, one adjacent to the other, in a direction perpendicular to the plane of FIG. 16.

Reference numeral 71 is a polyolefin optical disk substrate formed with the grooves and lands and pre-pits such as address pits. The grooves 62a and 62b, one adjacent to the other in the widthwise direction, form the recording track areas. The lands 63a and 63b formed in the shape of an inverted V in boundary areas between adjacent grooves 62a and 62b magnetically isolate the recording track areas from each other.

The magneto optical recording medium 61 of the present embodiment comprises, similarly to the first embodiment of the present invention, a transparent optical disk substrate 71 of polyolefin formed with the grooves and lands and the pre-pits such as address pits, on which are formed one on top of another a dielectric layer 72 for protecting a recording film and for adjusting the optical properties of the medium, the recording film comprising multiple layers 73, 74, 75, and 76, a dielectric layer 77 for protecting the recording film, and an overcoat layer 78.

The multilayer recording film consists of a readout layer 73 for detecting information from a copied magnetic domain expanded by wall displacement, a control layer 74 for reducing a ghost signal, an intermediate layer 75 for controlling the exchange coupling between the readout layer and recording layer, and the recording layer 76 for holding recorded information therein.

The magneto optical recording medium of the fourth embodiment of the invention shown here, like the magneto optical recording medium of the first embodiment, is a medium readable by the DWDD method in which the magnetic domain wall coming into the spot of the reading light beam is sequentially displaced in the readout layer and information in the copied magnetic domain expanded by the magnetic domain wall displacement is detected. This achieves super resolution readout exceeding the detection limit determined by the wavelength of the reading light and the numerical aperture of the objective lens.

The magneto optical disk 61 of the present embodiment comprises the multilayer film, containing the magnetic layers, formed on the optical disk substrate 71. The lands 63a and 63b are formed between the grooves 62a and 62b. The depth, h, of the grooves 62a and 62b is 75 nm measured from the top surface of the inverted V-shaped lands 63a and 63b. With the provision of the lands, the adjacent grooves 62a and 62b are magnetically independent of each other.

The track pitch of the magneto optical disk 61 of this embodiment is 0.5 µm, and the groove width is 0.45 µm.

A method of manufacturing the magneto optical recording medium of the fourth embodiment will be described below.

First, the transparent optical disk substrate 71 of polyolefin formed with the grooves and lands and the pre-pits such as address pits is molded.

Next, a B-doped Si target is placed in a DC magnetron sputtering chamber and, after fixing the optical disk substrate 71 to a substrate holder and holding it in a fixed position facing the target, the chamber is evacuated and exhausted by a cryopump until the pressure is brought down to $1 \times 10^{-5}$ Pa or less. With the chamber kept evacuated and exhausted, Ar gas and $N_2$ gas are introduced into the chamber until the pressure rises to 0.3 Pa, and then an SiN layer as the dielectric layer 72 is formed to a thickness of 80 nm by reactive sputtering.

The magnetic layers are formed thereon by DC magnetron sputtering using alloy targets. First, films of GdFeCoAl forming the readout layer 73 are successively deposited each to a thickness of 10 nm by DC magnetron sputtering using four alloy targets of different composition ratios, Gd26Fe59Co11Al4, Gd25Fe57Co10Al8, Gd24Fe54Co9Al13, and Gd23Fe51Co8Al18 (composition ratios by mol %).

Next, the control layer 74 of TbFe of thickness 5 nm, the intermediate layer 75 of TbFeAl of thickness 10 nm, and the recording layer 76 of TbFeCo of thickness 60 nm are deposited one on top of another by DC magnetron sputtering by using the respective alloy targets.

Next, the second dielectric layer 77 of SiN is formed to a thickness of 80 nm by reactive sputtering, in the same manner as the dielectric layer 72.

Finally, the overcoat layer 78 made of an urethane based resin is formed over the dielectric layer 77 by spin coating, and cured by irradiating it with ultraviolet radiation.

Here, the GdFeCoAl readout layer 73 is constructed from four layers of different compositions, i.e., a layer having a compensation composition temperature of 190° C. and a Curie temperature of 270° C., a layer having a compensation composition temperature of 155° C. and a Curie temperature of 220° C., a layer having a compensation composition temperature of 110° C. and a Curie temperature of 170° C., and a layer having a compensation composition temperature of 80° C. and a Curie temperature of 130° C.

The TbFe control layer 74 has a Curie temperature of 160° C. and, below the Curie temperature, the transition metal composition is always dominant.

The TbFeAl intermediate layer 75 has a Curie temperature of 145° C. and, below the Curie temperature, the transition metal composition is always dominant.

On the other hand, the TbFeCo recording layer 76 is constructed to have a compensation composition temperature of 30° C. and a Curie temperature of 310° C. by adjusting its composition.

The magneto optical recording medium 61 is fabricated by forming the multilayer film, containing the magnetic layers, on the optical disk substrate 71.

The optical disk substrate 71 includes the grooves 62a and 62b and the inverted V-shaped lands 63a and 63b formed in the boundary portions between adjacent grooves. The depth, h, of the grooves 62a and 62b is 75 nm measured from the upper surface of the lands 63a and 63b. With the provision of the lands 63a and 63b, the grooves 62a and 62b are magnetically independent of each other.

The magneto optical disk 61 of the present embodiment has a track pitch of 0.5 μm and a groove width of 0.45 μm.

The optical disk substrate 71 of the above structure uses polyolefin for the substrate material; as a result, even when the track pitch is small, the grooves 62a and 62b and the lands 63a and 63b can be formed by injection molding and, by using the sloping faces of the narrow lands 63a and 63b, the magnetic coupling between the adjacent grooves 62a and 62b (recording/readout areas) can be reliably cut off.

Furthermore, since the optical disk substrate 71 made of polyolefin has an excellent transfer characteristic, the lands 63a and 63b (isolation areas) and the grooves 62a and 62b (recording/readout areas) can be formed with narrower widths, provided that the land height relative to the grooves 62a and 62b is held within 80 nm.

The optical disk substrate 71 of polyolefin can also reduce the cycle time for substrate molding since it shows excellent transfer characteristics when the substrate is transferred from the stamper.

Furthermore, by utilizing the excellent transfer characteristic of the polyolefin optical disk substrate, the slope angle of the lands on the magneto optical disk medium can be increased, or the surface roughness of the sloping face can be varied. With the lands thus formed, the coupling at the boundary between the adjacent grooves 62a and 62b (recording/readout areas) can be reliably cut off.

Since the magneto optical recording medium 61 of the present embodiment is fabricated using the sputtering method in which the medium is held stationary opposite the target, as compared with the method that deposits films while rotating the substrate, film deposition can be performed without changing the sputtering direction of particles; as a result, if the track pitch is 1.01 μm or less, then if the groove depth is 20 nm or larger, the magnetic coupling between adjacent grooves can be cut off even when the lands are formed to make a relatively shallow groove shape; besides, the cutoff effect is large. This reason is that with the above structure, film is less likely to deposit on the sloping faces of the lands by sputtering.

In this case, when the thickness of the recording film is made thinner at the boundary between adjacent recording track areas than at the center of each recording track area, in particular, when the thickness of the recording film is made more than 20% thinner at the boundary between adjacent recording track areas than at the center of each recording track area, the grooves forming the recording track areas can be magnetically isolated from each other.

As described above, the magneto optical recording medium of the present embodiment comprises: a magnetic film that allows readout by the DWDD method without applying annealing; grooves; and inverted V-shaped lands formed between the grooves, wherein at least a portion of the film formed in the boundary area between adjacent recording tracks is reduced in thickness.

As a result, even when the mark length is 0.2 μm or smaller, a high magnetic domain wall mobility can be ensured at the time of readout by the DWDD method, and a readout signal of a readable level can be obtained from the copied magnetic domain expanded by wall displacement.

Furthermore, since polyolefin or like material having an excellent transfer characteristic is used for the optical disk substrate, narrower lands can be formed as the isolation areas, provided that the groove depth is made not smaller than 20 nm but not larger than 80 nm; furthermore, the cycle time for the production of the optical disk substrate by injection molding can be reduced, and a magneto optical recording medium having good signal characteristics for high density recording can be achieved.

The provision of the lands as magnetically isolated areas not used for information recording or readout serves to increase the overwrite power margin when overwriting with a new information signal.

Embodiment 5

Next, the structure of the magneto optical recording medium according to a fifth embodiment of the present invention will be described in detail below with reference to drawing.

Figure 17:
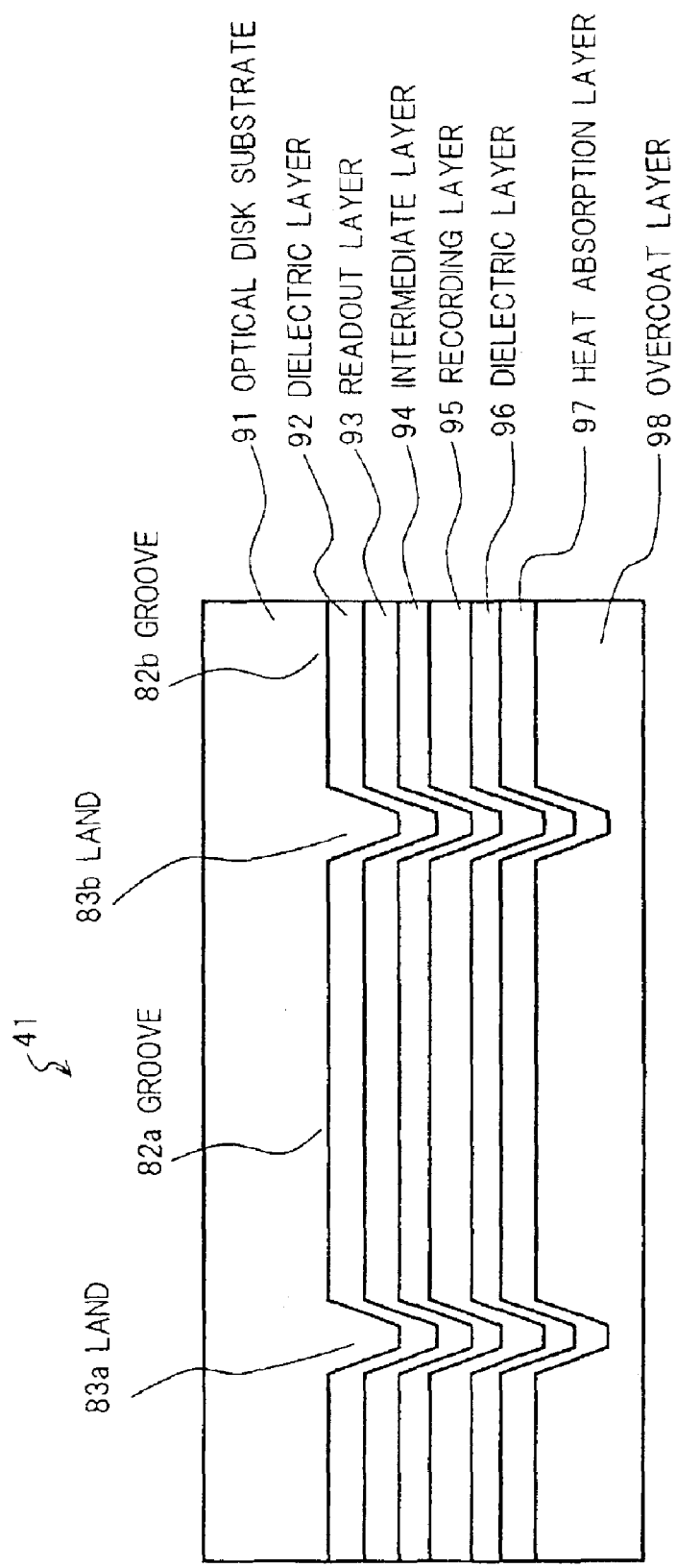
FIG. 17 is a cross sectional view showing the structure of a magneto optical recording medium according to a fifth embodiment of the present invention.

FIG. 17 is a cross sectional view showing the structure of the magneto optical recording medium (magneto optical disk) according to the fifth embodiment of the present invention. FIG. 17 shows the cross section of the disk-shaped magneto optical disk cut along the radial direction thereof. Grooves 82a and 82b forming recording track areas extend, one adjacent to the other, in a direction perpendicular to the plane of FIG. 17.

Reference numeral 91 is a polycarbonate optical disk substrate formed with the grooves and lands and pre-pits such as address pits, and the grooves 82a and 82b, one adjacent to the other in the widthwise direction, form the recording track areas. The lands 83a and 83b formed in the shape of a rectangle or trapezoid in boundary areas between adjacent grooves 82a and 82b magnetically isolate the recording track areas from each other.

The magneto optical recording medium 81 of the present embodiment comprises, similarly to the first embodiment of the present invention, a transparent optical disk substrate 91 of polycarbonate formed with the grooves and lands and the pre-pits such, as address pits, on which are formed one on top of another a dielectric layer 92 for protecting a recording film and for adjusting the optical properties of the medium, the recording film comprising multiple layers 93, 94, and 95, a dielectric layer 96, and a heat absorption layer 97, which is covered with an overcoat layer 98 for the protection of the recording film.

The multilayer recording film consists of a readout layer 93 for detecting information by wall displacement, an intermediate layer 94 for controlling the exchange coupling between the readout layer and recording layer, and the recording layer 95 for holding recorded information therein.

The magneto optical recording medium of the fifth embodiment of the invention shown here, like the magneto optical recording medium of the first embodiment, is a medium readable by the DWDD method in which the magnetic domain wall coming into the spot of the reading light beam is sequentially displaced in the readout layer and information in the copied magnetic domain expanded by the magnetic domain wall displacement is detected. This achieves super resolution readout exceeding the detection limit determined by the wavelength of the reading light and the numerical aperture of the objective lens.

The magneto optical disk 81 of the present embodiment is fabricated by forming the multilayer recording film, containing the magnetic layers, on the optical disk substrate 91.

The lands 83a and 83b are formed in the boundary areas between the grooves 82a and 82b; the depth, h, of the grooves 82a and 82b is 55 nm measured from the top surface of the lands 83a and 83b. The surface roughness of the lands is 2.0 nm when measured by AFM (Atomic Force Microscope), and is larger than that of the grooves 82 whose surface roughness in RMS (root mean square) is 1.2 nm.

The track pitch of the magneto optical disk 81 of this embodiment is 0.58 μm, and the groove width is 0.5 μm.

A method of manufacturing the magneto optical recording medium of the fifth embodiment will be described below.

First, the optical disk substrate 91 of polycarbonate formed with the grooves and lands and the pre-pits such as address pits is molded.

Next, the dielectric layer 92 of $ZnSSiO_2$ is formed by RF sputtering to a thickness of 80 nm on the optical disk substrate 91.

On top of it, the readout layer 93 of GdFeCoSi of thickness 30 nm, the intermediate layer 94 of TbFe of thickness 15 nm, and the recording layer 95 of TbFeCo of thickness 50 nm are successively formed by DC magnetron sputtering.

Next, the second dielectric layer 96 of $ZnSSiO_2$ is formed to a thickness of 30 nm by RF sputtering.

Then, the heat absorption layer 97 of AlTi is formed to a thickness of 50 nm by DC magnetron sputtering.

Finally, the protective layer 98 made of an epoxy acrylate based resin is formed over the heat absorption layer 97 by spin coating, and cured by irradiating it with ultraviolet radiation.

Here, the GdFeCoSi readout layer 93 formed using alloy targets consists of three layers of different compositions, i.e., a layer having a compensation composition temperature of 130° C. and a Curie temperature of 250° C., a layer having a compensation composition temperature of 80° C. and a Curie temperature of 200° C., and a layer having a compensation composition temperature of 40° C. and a Curie temperature of 155° C.

The TbFe intermediate layer 94 has a Curie temperature of 160° C. and, below the Curie temperature, the rare earth metal composition is always dominant.

On the other hand, the TbFeCo recording layer 95 is constructed to have a compensation composition temperature of 50° C. and a Curie temperature of 280° C. by adjusting the compositions of the alloy targets used.

The magneto optical recording medium of the fifth embodiment is fabricated by forming the multilayer film, containing the magnetic layers, on the optical disk substrate 91.

The optical disk substrate 91 includes the grooves 82a and 82b and the lands 83a and 83b formed between the grooves and having a surface roughness different than that of the grooves; the depth, h, of the grooves 82a and 82b is 55 nm measured from the top surface of the lands 83a and 83b, and the surface roughness of the land measured by AFM is not smaller than 1.5 nm, while the surface roughness of the grooves measured by AFM is not larger than 1.5 nm. With the provision of the lands, the grooves 82a and 82b are magnetically independent of each other.

The track pitch of the magneto optical disk 81 of this embodiment is 0.58 μm, and the groove width is 0.5 μm.

With the structure of the present embodiment described above, even when the track pitch is small, the magnetic coupling between the mutually adjacent grooves 82a and 82b (recording/readout areas) can be reliably cut off by utilizing the surface roughness of the lands 83a and 83b and the surface roughness of the sloping portions.

In particular, by varying the perpendicular magnetic anisotropy of the recording film containing the readout layer by utilizing the substrate surface roughness of the sloping portions and the lands 83a and 83b formed on the optical disk substrate 91 of the magneto optical recording medium 81, the coupling between the mutually adjacent grooves 82a and 82b (recording/readout areas) can be reliably cut off.

Furthermore, since the sloping portions of the lands 83a and 83b formed on the optical disk substrate 91 also have a large surface roughness, when the information signal held in a recorded domain in the recording layer 95 is copied into the readout layer 93, the sloping portions of the lands 83a and 83b having a large surface roughness of 2 nm act to suppress the wall displacement of the copied magnetic domain and, as a result, the unwanted ghost signal copied from the rear end of the laser beam spot can be reduced at the time of readout by the DWDD method.

When the planar portions of the lands or the sloping faces between the land and groove are made to have a large surface roughness of Ra(L)≧1.5 nm when measured by AFM, and the inside surfaces of the grooves where information is recorded are formed as smooth surfaces with a surface roughness of Ra(G)≦1.5 nm when measured by AFM, magnetic isolation can be provided between adjacent grooves or at the boundary between the planar and sloping faces of the land. This achieves the excellent characteristic that a high magnetic domain wall mobility can be obtained at the time of readout by the DWDD method, while at the same time, reducing the ghost signal occurring from the rear end of the beam spot.

Figure 19:
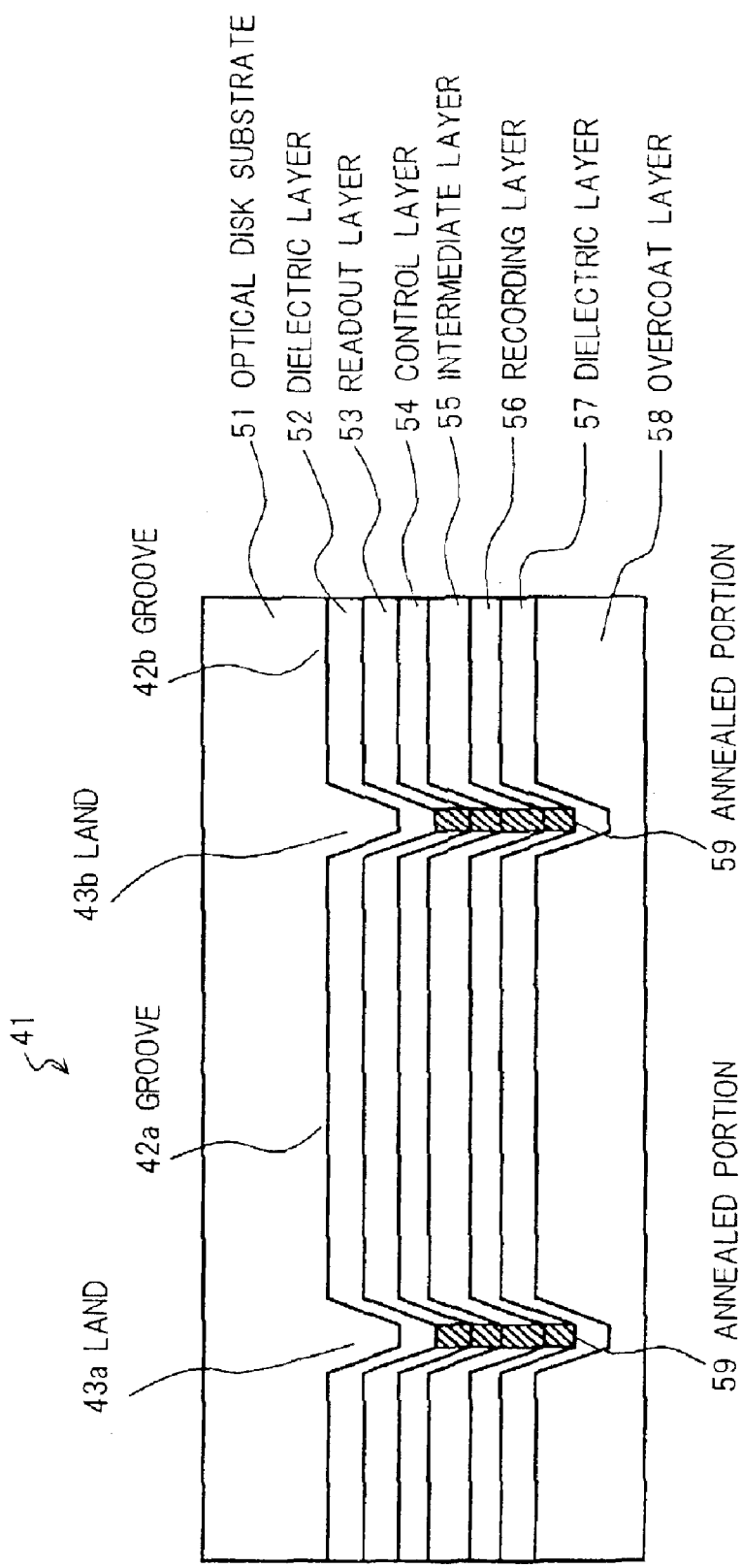
FIG. 19 is a cross sectional view showing the structure of a magneto optical recording medium according to an alternative embodiment of the present invention.

A description will be given below of a magneto optical recording medium of an alternative embodiment in which the land area is annealed by applying laser light. FIG. 19 is a cross sectional view schematically showing the structure of the magneto optical recording medium of the alternative embodiment treated with annealing.

In the case of prior art magneto optical recording media using the DWDD method, in order to magnetically isolate adjacent recording tracks from each other it has been practiced to apply annealing to sufficiently reduce the magnetic anisotropy of the magnetic film over the entire surface of the land area formed between the recording tracks.

By contrast, in the case of the magneto optical recording medium of the present embodiment, since the film thickness is increased at the center of the groove and reduced at the groove-land boundary, the magnetic domain wall displacement associated with the DWDD method is possible without applying annealing, and sufficiently good readout signal characteristics can be obtained.

On the other hand, in the magneto optical recording medium of the alternative embodiment described herein, a portion of the land (the portion indicated by oblique hatching in FIG. 19) is annealed, in addition to varying the film thickness within the groove, which is the feature of the present invention. This serves to further improve the magnetic domain wall mobility characteristic of the recording film in the DWDD method. By varying the film thickness within the groove, magnetic isolation higher than a certain level is provided between the adjacent recording tracks. Therefore, unlike the case of the prior art magneto optical recording medium, it is not necessary to sufficiently reduce the magnetic properties of the magnetic film over a wide area covering the entire surface of the land. In the magneto optical recording medium of the alternative embodiment, it is only necessary to reduce the magnetic anisotropy of a portion of the film between the recording areas to a certain degree, depending on the thickness profile within the groove, the shape of the land, etc. This increases the magnetic isolation effect, and ensures better readout signal characteristics.

In the magneto optical recording medium of the alternative embodiment, the area to be annealed can be reduced compared with the prior art magneto optical recording medium. Further, sufficiently good readout signal characteristics can be obtained by reducing the magnetic anisotropy to a certain degree, and there is no need to sufficiently reduce it as in the prior art magneto optical recording medium. Accordingly, the annealing can be performed using a laser of small power. Since the radiation time of laser light per unit area can be reduced, the annealing can be performed by rotating the magneto optical recording medium at a higher speed than the prior art. This serves to reduce the annealing time. Compared with the annealing step for the prior art magneto optical recording medium, the annealing step for the magneto optical recording medium of the present invention is less costly and requires less time.

As described above, in the magneto optical recording medium of the alternative embodiment, there is no need to provide complete magnetic isolation between adjacent recording tracks by relying only on annealing, but it is only necessary to anneal a portion of the land only partially. That is, by applying annealing to such a degree as to assist the isolation effect provided by the shape of the groove and the film thickness profile of the land, the adjacent tracks can be magnetically isolated from each other, achieving sufficiently good readout signal characteristics for the DWDD method.

The prior art has had the problem that setting the annealing conditions is difficult because the entire area between the adjacent recording tracks has had to be annealed. In the magneto optical recording medium of the alternative embodiment, on the other hand, since some degree of magnetic isolation is already provided between the adjacent recording tracks because of the shape of the groove and the film thickness profile within the land, setting the annealing conditions is easy and the range of conditions that can be set is extended.

Furthermore, in the magneto optical recording medium of the alternative embodiment, the film thickness profile within the groove serves to increase the amount of heat absorbed at the boundary between the adjacent recording tracks when the recording/reading beam spot is focused on the medium. This makes it possible to form a temperature gradient optimum for forming a recorded magnetic domain in the recording track, especially within the groove, and a recorded magnetic domain whose recorded mark shape is close to the readout spot shape can be formed. As can be seen from the above, the magneto optical recording medium of the alternative embodiment has excellent readout signal characteristics for high density recording.

As described above, in the magneto optical recording medium of the present invention, the film thickness of at least a portion of the boundary area between the mutually adjacent recording track areas is made smaller than the film thickness at the center of the recording track area, and more specifically, the thickness of a portion of the recording film formed on the land between the mutually adjacent grooves is made more than 20% smaller than the thickness of the recording film at the center of the groove.

With this structure, when information recorded on the magneto optical recording medium of the present invention is read out using the DWDD readout method, since the recording film containing the readout layer is magnetically separated between the adjacent recording tracks, the recorded magnetic domain formed in the recording layer of the recording film is copied into the readout layer only in the groove area of the optical disk substrate, and the recorded information is read out from the copied magnetic domain expanded by displacing the wall of the copied magnetic domain in the readout layer.

As described above, the present invention achieves a magneto optical recording medium suitable for readout by the DWDD method.

When the groove depth is set within the range of $\lambda/(20n)$ to $\lambda/(5n)$ (n is the refractive index of the optical disk substrate) where $\lambda$ is the laser wavelength (660 nm in this embodiment), or when the height of the land formed between the grooves is set within the range of 20 nm to 80 nm, magnetic domain wall isolation between the adjacent grooves can be easily achieved, providing the excellent characteristic that a readout signal of a readable level can be obtained from a signal of a short mark length.

On the other hand, when a violet laser or the like is used, the magnetic coupling between the adjacent grooves can be reliably cut off by setting the groove depth within the range of $\lambda/(20n)$ to $\lambda/(3n)$ where $\lambda$ is the laser wavelength.

Next, recording and readout methods and recording and readout apparatus for the magneto optical recording medium of the embodiment of the present invention will be described below.

The DWDD method is suitable as the readout method for the magneto optical recording medium of the embodiment of the present invention.

The magneto optical recording and readout method of the present embodiment records information on the magneto optical recording medium of the embodiment described above and reads the recorded information by using a magneto optical recording and readout apparatus capable of recording and reading information using a recording power and reading power higher than those used in conventional systems. The magneto optical readout method of the present embodiment, using the DWDD method, forms a copied magnetic domain in the readout layer by copying a recorded magnetic domain formed in the recording layer of the magneto optical recording medium, expands the copied magnetic domain by displacing the magnetic domain wall of the copied magnetic domain in the readout layer in the region irradiated by a laser beam spot, and detects the readout signal of the recorded information from the copied magnetic domain thus expanded.

The magneto optical recording and readout apparatus of the present invention records information and reads recorded information on the magneto optical recording medium of the present invention by using the above-described magneto optical recording and readout method.

The recording and readout method for the magneto optical recording medium according to the present invention records, reads, and erase information by using laser light; at the time of readout, the laser beam spot is applied onto the magneto optical recording medium from the readout layer side and, while performing tracking control utilizing reflected light from the magneto optical recording medium, the laser beam spot is moved relative to the magneto optical recording medium, thereby forming a temperature profile having a gradient along the moving direction of the laser beam spot.

The readout method for the magneto optical recording medium forms in the readout layer a temperature profile having a temperature region where the force generated based on the temperature profile and acting to displace the magnetic domain wall formed in the readout layer toward the higher temperature direction is greater than the coupling force acting via the intermediate layer between the magnetic domain in the recording layer and the magnetic domain in the readout layer; in this condition, a copied magnetic domain holding information copied from the recording layer is formed in the readout layer within the region irradiated by the laser beam spot, and the information in the copied magnetic domain expanded by displacing the magnetic domain wall of the copied magnetic domain in the readout layer is detected in the form of a change in the polarization plane of the reflected light of the beam spot.

In the readout method for the magneto optical recording medium according to another aspect of the invention, the information in the recorded magnetic domain is detected which is copied in stepwise manner in the depth direction of the readout layer and is expanded by displacing the magnetic domain wall. In the readout method for the magneto optical recording medium according to a further aspect of the invention, the coupling force acting via the intermediate layer of the magneto optical recording medium is either a magnetic coupling force or an exchange coupling force or a static magnetic force, wherein the recorded magnetic domain is copied only from the temperature region where the signal can be copied by the magnetic coupling between the recording layer and the readout layer, and the signal is detected by expanding the copied magnetic domain.

As described above, the magneto optical recording medium of the present invention comprises a magnetic film that allows readout by the DWDD method, and has the structure such that the thickness of at least a portion of the recording film in the boundary area between the mutually adjacent recording track areas (recorded information rewritable areas) is smaller than the thickness of the recording film in the center portions of the recording track areas.

This ensures a high magnetic domain wall mobility for the copied magnetic domain in the readout layer of the magneto optical recording medium, and thus a readout method can be achieved that obtains a readout signal of a readable level from the copied magnetic domain expanded by displacing the wall of the copied magnetic domain by the DWDD method without applying annealing (or by only applying supplemental annealing) to the area between the recording track areas.

Further, the structure is such that the thickness of at least a portion of the recording film formed between the mutually adjacent recording track areas in the readout layer is smaller than the thickness of the recording film in the center portions of the recording track areas.

Information is recorded in the groove, a recording track area, that has a shallow groove depth, and the land formed between the mutually adjacent recording track areas acts to cut off the magnetic coupling between the adjacent recording track areas. This achieves a recording and readout method for a magneto optical recording medium that not only ensures a high magnetic domain wall mobility for the copied magnetic domain in the readout layer for signal readout by the DWDD method, but can also detect the readout signal stably from the copied magnetic domain expanded by displacing the wall of the copied magnetic domain in the readout layer, while performing tracking control by utilizing reflected light, etc. from the groove.

The magneto optical recording medium of each of the above embodiments has been described for the structure that uses polycarbonate or polyolefin for the optical disk substrate, but it is also possible to use a glass substrate having guide grooves or pre-pits formed of photopolymers or an optical disk substrate formed from an epoxy based resin or other plastic material.

Further, the optical disk substrate of each embodiment has been described for the magneto optical recording medium formed with spiral or concentric guide grooves for beam spot tracking or pre-pits for guiding a meandering (or wobbling) track as used in a sample servo method or the like, but it is also possible to use an optical disk substrate that has a meandering (or wobbling) spiral guide groove containing address information, or an optical disk substrate that combines pre-pits with a meandering (or wobbling) tracking guide groove as used in a sample servo method or the like.

The magneto optical recording medium of each of the above embodiments has been described for the structure that uses SiN or $ZnSSiO_2$ films for the first and second dielectric layers, but it is also possible to use other films such as a ZnS film or other chalcogen compound film, an oxide film such as $TaO_x$, a nitride film such as AlN, or a thin film of their compounds. The thickness of each dielectric layer should be set suitably within the range of 40 nm to 300 nm where the signal level is increased by an enhancement effect.

Each of the above embodiments has been described for the magneto optical recording medium comprising a recording film which comprises multiple magnetic layers, i.e., a readout layer of GdFeCoCr, GdFeCoAl, GdFeCoAlTi, or GdFeCoSi, a control layer of TbFe or TbFeCr, an intermediate layer of TbFe, TbDyFe, TbDyFeAl, or TbFeAl, and a recording layer of TbFeCo or TbFeCoCr; instead, rare earth-transition metal based ferrimagnetic amorphous alloys such as TbCo, GdCo, GdTbFe, GdTbFeCo, or DyFeCo, magneto optical materials using polycrystalline materials of Mn based magnetic films such as MnBi, MnBiAl, or PtMnSn, platinum group-transition metal alloys such as garnet, PtCo, or PdCo, etc., may be used for the recording film; or the recording film may be a film with a periodic structure or a superlattice structure made from gold, platinum group-transition metal alloys such as Pt/Co, Pd/Co; or these materials may be contained in the recording film comprising the plurality of recording layers of different materials or compositions. Elements such as Cr, Al, Ti, Pt, or Nb may be added to the above layers to improve corrosion resistance.

Further, adding an element such as Al, Ti, Cr, or Nb has the effect of reducing the magnetic domain wall coercivity of the readout layer, and achieves signal characteristics with improved and stable DWDD characteristics.

In the above embodiments, magnetic films (recording films) with the structure of three layers or four layers are described while the readout layers have different compositions. But the magnetic film may have the structure of two layers or more layers if the stable readout by the DWDD method is possible.

In the above embodiments, the readout layer, control layer, intermediate layer, recording layer, etc. forming the multilayer recording film have been described as having a thickness limited to within a specific range, for example, 30 nm to 60 nm for the readout layer and recording layer and 5 nm to 15 nm for the control layer and intermediate layer, but the thickness of each layer is not limited to the range described in the above embodiments; for example, the thickness of each layer may be set within a range of 5 nm to 200 nm as long as the characteristics of the present invention are satisfied and as long as a good magnetic coupling force between the recording layer and the readout layer can be obtained; more preferably, if the thickness of the readout layer is set within a range of 10 nm to 100 nm, the thickness of the control layer within a range of 5 nm to 50 nm, the thickness of the intermediate layer within a range of 5 nm to 50 nm, and the thickness of the recording layer within a range of 30 nm to 200 nm, for example, the same effect as described in the embodiments can be obtained.

A recording assisting layer, a copy control layer (or a transfer control layer), or other magnetic layer for improving other recording/readout characteristics may be further added.

Further, the intermediate layer may be constructed from a multilayer magnetic film with its composition or magnetic domain wall energy density varied across the thickness of the film.

The magnetic layer forming each layer in the magneto optical recording medium of the present invention can be formed by setting the Ar gas pressure for film deposition to within a range of 0.3 Pa to 2.0 Pa and by depositing the film by magnetron sputtering using the corresponding metal material target or an alloy target containing the corresponding materials. This also applies to the case where the rare earth metal composition such as Gd in the magnetic film to be formed is varied due to film deposition conditions such as Ar gas pressure and bias magnetic field for film deposition in the film formation process or due to factors relating to the equipment used.

For example, when forming a film by varying the Gd composition ratio in GdFeCo within a range of 24% to 27%, the desired film can be formed by varying the Ar gas pressure for film deposition from 1.2 Pa to 0.4 Pa.

Furthermore, when the sputtering direction of deposition particles is controlled by varying the equipment conditions for the multiple-targets sputtering equipment or the sputtering equipment in which the medium is held stationary opposite the target, the effect of reducing the film thickness at the recording track boundary in the groove area is further enhanced, ensuring reliable isolation between recording tracks and making smooth magnetic domain wall displacement possible within the groove.

The structure having a heat absorption layer of AlTi formed on the recording layer via a dielectric layer has also been described, but in this structure, the heat absorption layer may be formed directly on the recording layer by eliminating the dielectric layer.

Alternatively, the heat absorption layer may be formed on the recording layer by sandwiching therebetween a very thin dielectric layer of 5 nm to 30 nm in thickness.

Furthermore, the dielectric layer sandwiched between the recording layer and the heat absorption layer may be constructed from a plurality of dielectric layers having different coefficients of thermal conductivity.

Any alloy material that contains at least one of Al, Cu, Ag, and Au elements and that has a larger coefficient of thermal conductivity, than the recording film can be used for the heat absorption layer.

The overcoat layer (protective layer) has been described as being formed from an epoxy acrylate based resin or an urethane based resin, but other ultraviolet curing resin or thermosetting resin may be used; alternatively, a structure laminated to a base material using a hot melt adhesive may be employed.

The invention has been described for the magneto optical recording medium and its readout method that use the DWDD method, but for other readout methods, such as a magnetic domain expansion readout method involving magnetic domain wall displacement, a reading magnetic field alternating type readout method or a readout domain expansion readout method involving shrinking action, or any other recording and readout method intended to increase signal quality or recording density, the same effect or a better effect can be obtained by the present invention using the structure that cuts off the magnetic properties between adjacent tracks during the copying and reading of the recorded magnetic domain.

For a magneto optical recording medium that dramatically increases the recording density and transfer rate by using a magnetic domain wall displacement type expansion readout method utilizing a temperature gradient in the recording film, the present invention provides a structure in which the thickness of at least a portion of the recording film formed in the boundary area between mutually adjacent recording track areas (recorded information rewritable areas) is made smaller than the thickness of the recording film in the center portions of the recording track areas, thereby ensuring a high magnetic domain wall mobility for the copied magnetic domain in the readout layer.

According to the present invention, there is offered the advantageous effect of being able to achieve a magneto optical recording medium that allows a signal of a readable level to be read out from the copied magnetic domain expanded by displacing the wall of the copied magnetic domain in accordance with the DWDD method without applying annealing (or by only applying supplemental annealing) to the area between the recording track areas.

Furthermore, the signal with the mark length of 0.2 $\mu$m or smaller can be recorded and reproduced in a stable manner since a temperature gradient in the beam spot can be uniform in the width direction of the recording track.

As an effective method for forming the reduced recording film thickness region in the boundary area between the mutually adjacent recording track areas (recorded information rewritable areas), the recording track areas for recording information should be formed as grooves with a shallow depth.

In particular, if the structure is such that a land is formed in the boundary area between the mutually adjacent recording track areas, and that the groove depth measured from the top surface of the land is set as small as $\lambda/(20n)$ to $\lambda/(3n)$ ($\lambda$ is the wavelength of the laser light, and n is the refractive index of the optical disk substrate), the optical disk substrate is easy to mold. Furthermore, by using such an optical disk substrate, not only can noise from the grooves be reduced and cross write and cross talk during information recording/readout be prevented, but data left unerased after overwriting can also be reduced.

According to the present invention, the optical disk substrate having relatively shallow grooves is easy to mold, and further, the cycle time for the production of the optical disk substrate can be reduced. This serves to increase the productivity of the optical disk substrate.

Furthermore, with the method that manufactures the magneto optical recording medium by a film deposition method using alloy targets in which the medium is held stationary opposite the target, it is also possible to achieve a magneto optical recording medium that has excellent recording film productivity and reproducibility and that provides a good magnetic isolation effect between adjacent tracks.

Furthermore, when the land is constructed to have a sloping face with a slope angle of 40 to 70 degrees, or when the groove for recording information is formed with a smooth surface, and the planar surface of the land or the sloping face connecting between the land and groove is formed with a surface roughness larger than the surface of the information recording groove (that is, the surface of the former is made rougher than the surface of the latter), it becomes possible to cut off the magnetic coupling between adjacent grooves or at the boundary between the planar surface and sloping face of the land. The invention provides the excellent effect of being able to ensure a high magnetic domain wall mobility for the copied magnetic domain in the readout layer and to reduce the ghost signal occurring from the rear end of the beam spot when the magneto optical recording medium of the present invention is played back for reading by the DWDD method.

In this way, according to the present invention, the readout resolution of the high density information signals recorded on the magneto optical recording medium can be increased without being restricted by the diffraction limit of the optical system.

The present invention provides a magneto optical recording medium that allows higher data transfer rates, and that ensures stable readout signal characteristics by stably controlling the size of the copied magnetic domain in the DWDD method, provides increased signal amplitude, and achieves high density and excellent signal characteristics. Furthermore, since signals can be read out by reducing superimposed signals, the invention offers the excellent effects that various margins are increased, and that the production cost of the magneto optical recording medium and the cost of the recording and readout apparatus can be reduced.

Although the invention has been described in some detail dealing with the preferred embodiments, the configuration details of any of the preferred embodiments disclosed herein may be changed or modified, and any changes in the combination or order of elements thereof can be accomplished without departing from the spirit and scope of the invention as set forth in the appended claims.

INDUSTRIAL APPLICABILITY

The present invention can be applied to a magneto optical recording medium on which information is recorded and erased utilizing a temperature rise caused by the radiation of a laser beam, and from which recorded signals are read out using a magneto optical effect, and also to a manufacturing method for the medium and a method and apparatus for reading the medium.

We claim:

1. A magneto optical recording medium comprising:
   a substrate; and
   a multilayer recording film including readout, intermediate, and recording layers that are successively formed on top of said substrate and are magnetically coupled with each other; and
   a recorded magnetic domain formed in said recording layer is copied into said readout layer, and recorded information is read out by displacing a magnetic domain wall in said readout layer wherein at least a part of said multilayer recording film lying in a boundary portion between mutually adjacent recording track areas is formed more than 20% thinner than another part of said multilayer recording film lying in center portions of said recording track areas.

2. A magneto optical recording medium comprising:
   a substrate;
   grooves;
   lands formed between said grooves; and
   a multilayer recording film including readout, intermediate, and recording layers that are successively formed on top of said substrate and are magnetically coupled with each other, wherein
   magnetization of said readout layer on said groove is cut off at said lands;
   only on said grooves, a recorded magnetic domain formed in said recording layer is copied into said readout layer, and recorded information is read out by displacing a magnetic domain wall in said readout layer;
   at least a part of said multilayer recording film lying in a boundary portion between mutually adjacent recording track areas is formed thinner than another part of said multilayer recording film lying in the center portions of said recording track areas; and
   height difference between said land and said groove is within a range of $\lambda/(20n)$ to $\lambda/(3n)$ (where $\lambda$ is the wavelength of reading light, and n is the refractive index of the substrate of said magneto optical recording medium).

3. A magneto optical recording medium comprising:
   a substrate;
   grooves;
   lands formed between said grooves; and
   a multilayer recording film including readout, intermediate, and recording layers that are successively formed on top of said substrate and are magnetically coupled with each other, wherein
   magnetization of said readout layer on said groove is cut off at said lands;
   only on said grooves, a recorded magnetic domain formed in said recording layer is copied into said readout layer, and recorded information is read out by displacing a magnetic domain wall in said readout layer;
   at least a part of said multilayer recording film lying in a boundary portion between mutually adjacent recording track areas is formed thinner than another part of said multilayer recording film lying in center portions of said recording track areas; and
   height difference between said land and said groove is within a range of 20 nm to 80 nm.

4. A magneto optical recording medium comprising:
   a substrate;
   grooves;
   lands formed between said grooves; and
   a multilayer recording film including readout, intermediate, and recording layers that are successively formed on top of said substrate and are magnetically coupled with each other, wherein
   magnetization of said readout layer on said groove is cut off at said lands;
   only on said grooves, a recorded magnetic domain formed in said recording layer is copied into said readout layer, and recorded information is read out by displacing a magnetic domain wall in said readout layer;
   at least a part of said multilayer recording film lying in a boundary portion between mutually adjacent recording track areas is formed thinner than another part of said multilayer recording film lying in center portions of said recording track areas; and
   at least one of planar and sloping portions of said land has a larger surface roughness than a groove surface where an information signal is recorded.

5. The magneto optical recording medium according to claim 4, wherein the surface roughness of at least one of said planar and sloping portions of said land is 1.5 nm or larger.

6. The magneto optical recording medium according to claim 4, wherein the surface roughness of said groove for recording said information signal is 1.5 nm or smaller.

7. A magneto optical recording medium comprising:

a substrate formed with pre-pits; and a multilayer recording film including readout, intermediate, and recording layers that are successively formed on top of said substrate and are magnetically coupled with each other, wherein a recorded magnetic domain formed in said recording layer is copied into said readout layer, and recorded information is read out by displacing a magnetic domain wall in said readout layer;

at least a part of said multilayer recording film lying in a boundary portion between mutually adjacent recording track areas is formed thinner than another part of said multilayer recording film lying in center portions of said recording track areas; and the depth of each of said pre-pits is within a range of $\lambda/(20n)$ to $\lambda/(3n)$ (where $\lambda$ is the wavelength of reading light, and n is the refractive index of the substrate of said magneto optical recording medium).

* * * * *